United States Patent [19]

Holme

[11] 4,057,804
[45] Nov. 8, 1977

[54] BRANCHED PATH COMMUNICATIONS APPARATUS FOR ROUTING COMMUNICATIONS SIGNALS

[75] Inventor: William Raymond Holme, Brampton, Canada

[73] Assignee: Holme Communications Systems, Inc., Canada

[21] Appl. No.: 615,830

[22] Filed: Sept. 22, 1975

Related U.S. Application Data

[63] Continuation-in-part of Ser. No. 383,408, July 27, 1973, abandoned.

[30] Foreign Application Priority Data

Aug. 11, 1975 Canada .................................. 233242
June 21, 1973 Canada .................................. 174682

[51] Int. Cl.² .......................................... H04L 5/00
[52] U.S. Cl. .............................. 343/200; 179/2.5 R; 179/18 G
[58] Field of Search ............... 343/175, 176, 177, 200, 343/207, 205; 325/3, 15.5, 308; 179/15 FD, 18 GE, 18 GF, 2.5 R, 18 G, 18 H, 15 EA; 200/175–177; 358/86

[56] References Cited

U.S. PATENT DOCUMENTS

| | | | |
|---|---|---|---|
| 2,894,074 | 7/1959 | Elliott | 343/176 |
| 3,614,330 | 10/1971 | Chaveneaud et al. | 179/18 GE |
| 3,629,512 | 12/1971 | Yuan | 179/18 GE |
| 3,660,600 | 5/1972 | Lee, Jr. | 179/18 GE |
| 3,699,295 | 10/1972 | Shinohara et al. | 200/175 |
| 3,809,815 | 5/1974 | Reed et al. | 179/2.5 R |
| 3,864,521 | 2/1975 | Delong et al. | 179/2.5 R |
| 3,894,194 | 7/1975 | Frost | 343/176 |

Primary Examiner—Robert L. Griffin
Assistant Examiner—Jin F. Ng
Attorney, Agent, or Firm—Cushman, Darby & Cushman

[57] ABSTRACT

A path routing arrangement to perform path routing operations for wideband communications between subscriber terminals of a communications system is disclosed. To enable such communications the invention incorporates principles of frequency division to allow communications carriers to share a common transmission path, a plurality of which transmission paths may be selectively defined through a branched path path routing arrangement, desired paths being so defined to allow bi-directional carrier transmission between calling ones and called ones of the subscriber terminals.

17 Claims, 18 Drawing Figures

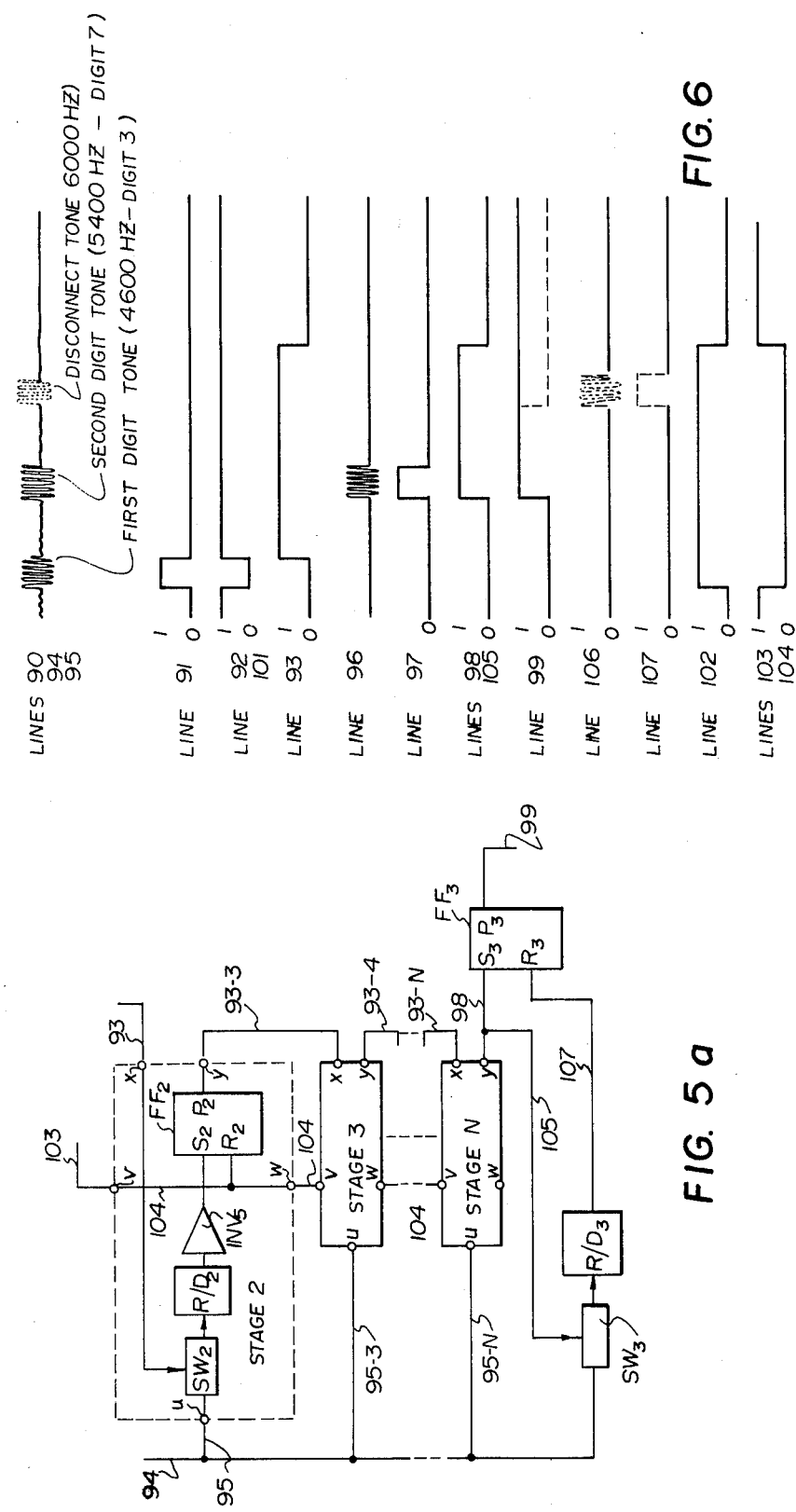

BRANCHED PATH COMMUNICATIONS APPARATUS FOR ROUTING COMMUNICATIONS SIGNALS

This application is a continuation-in-part of application Ser. No. 383,408 filed 27 July, 1973, now abandoned.

The invention relates to communications and more particularly to frequency division branched path routing systems for interconnecting subscriber terminals in carrier communications systems.

Many common switching systems fall into a category generally referred to as switched path routing systems. Such systems include manual switched path routing systems, progressive control switched path routing systems and common control switched path routing systems, all of which are well known in the art. Commonly, today's telephone switching systems use either dedicated (Strowger type) path or common control switching principles (panel, crossbar, electronic switches) to interconnect subscriber terminals. In existing systems substantially designed for audio communication but which are adapted for picture phone transmission, separate paths are commonly used for the audio and video components of the communications signal. Such adaptation is difficult and the cost may be prohibitive thus precluding the mass use of picture phone and wideband carrier facilities.

In recent years, primarily because faster routing speeds can be achieved where there is no physical switching, the tendency in modern communication system design has been away from switched path routing to what is commonly referred to as time division switching. The technology of time division switching has been successfully used, for example, in relation to carrier telephone transmission, computer technology, and small voice band private exchanges. However, as is well known, the performance of a time division switching systems is dependent on the synchronization of sampling gates and on sampling rate. As the component frequencies of the communications intelligence increases the required sampling rate to ensure reproduction of a reasonable facsimile thereof at a receiving terminal increases. Where the same physical path is used for several communications signals appearing in different time slots the sampling rates must further increase. If the operation of sampling gates is not carefully synchronized, intelligence may be lost or confused with intelligence appearing in different time slots.

Accordingly, a principle object of the present invention is to provide a system to interconnect a plurality of subscriber terminals to allow bi-directional audio, video, audio/video, or high speed data communication to take place between calling ones and called ones of the subscriber terminals.

It is a further object of the present invention that such bi-directional communication between a particular calling subscriber terminal and a particular called subscriber terminal take place over a single transmission path defined between the calling subscriber terminal and the called subscriber terminal.

It is a further object of the present invention to avoid the use in such system of sophisticated high speed sampling technology as is required for time division switching of video and high speed data intelligence.

According to the present invention, there is provided a system, herein referred to as a frequency division branched path routing system, for interconnecting a plurality of subscriber terminals to allow bi-directional carrier communication between calling ones and called one of the subscriber terminals. The system includes a path routing arrangement which is common to all subscriber terminals.

The path routing arrangement comprises a plurality of first transmission tracks and an equal number of second transmission tracks interconnected by branched path means for selectively providing a desired carrier transmission path between a preselected one of the first transmission tracks and preselected one of the second transmission tracks to define a transmission path through said path routing arrangement for a first communications carrier having a first predetermined carrier frequency and propagating in a first direction along the defined path and for a second communications carrier having a second predetermined carrier frequency and propagating in the opposite direction along the defined path, the second carrier frequency being different from the first carrier frequency by a predetermined amount. The division in frequency between the first and second carrier frequency permits non-interfering simultaneous communication over the defined path. Each of the transmission tracks are electrically unbalanced and shielded to substantially confine communications carriers propagating therein and allows communications carriers gaining access thereto to propagate in and energize the track or path.

In one embodiment of the path routing arrangement it is contemplated that the first transmission tracks will be arranged in n first groups of n first transmission tracks per first group, and that the second transmission tracks will be arranged in n second groups of n second transmission tracks per second group. According to this embodiment, for each particular first group, the branched path interconnecting means comprises a third group of n third transmission tracks each of which transmission tracks interconnects with each first transmission track of such particular group and interconnects with each second transmission track of a unique one of said second groups. Generally, it is contemplated that each third transmission track will be interconnected to each first transmission track by a first means for selectively providing a communications path between the first transmission track and the third transmission track, and will be interconnected with each second transmission track by a second means for selectively providing a communications path between the second transmission track and the third transmission track.

The transmission track themselves may be any suitable carrier transmission medium, unbalanced and shielded as aforesaid. This would include waveguide structures used generally for propagation at microwave frequencies. However, it is contemplated that where the bandwidth of communications signals does not otherwise dictate, co-axial lines which are likely to be less costly will be used.

The first and second means referred to above may be a coded transmission gate normally closed to prevent transmission between the transmission tracks interconnected by the transmission gate. Each such transmission gate includes means for receiving a coded input signal, and if the coded input signal represents, in a selected code, the identification of the transmission gate, for causing the gate to open to allow carrier transmission between the transmission tracks interconnected by the transmission gate. Advantageously, to define a transmission path between a preselected first transmission track and a preselected second transmission track, the coded input signals to which the transmission gates respond may be provided as an input to the preselected first transmission track. Generally it is contemplated that such coded input signals are provided as modulated or unmodulated carriers having a frequency sufficiently high to propagate in the transmission track. Also, the case of co-axial lines, the frequency should not be so low that surface currents producing undesirable interference are generated at the surface of the outer conductor. According to this embodiment of the path routing arrangement, each transmission gate includes means to detect the presence of a coded input signal in a transmission track. A transmission gate interconnecting a first transmission track and a third transmission track detects coded input signals appearing in the first transmission track, and a transmission gate interconnecting a third transmission track and a second transmission track detects signals appearing in the third transmission track.

Alternatively however, coded input signals to control transmission gates may be provided on control signal lines separate from the transmission track of the path routing arrangement. Optionally, particularly where the path routing arrangement is relatively small such as might be used in an inter-office communication system, the transmission gates may be manually operated mechanical devices — i.e., a basic switch for making or breaking an electrical connection between transmission tracks.

In systems interconnecting a plurality of subscriber terminals and incorporating a path routing arrangement as described, a calling subscriber terminal transmits to a called subscriber terminal on a pre-assigned first carrier frequency and receives from the called subscriber terminal on a pre-assigned second carrier frequency. Where, for example, transmission gates are controlled by coded signal inputs to define desired bi-directional transmission paths through the path routing arrangement, such inputs are provided by line equipment means associated with the calling subscriber terminals in response to instructions received from the subscriber terminals.

Typically, the line equipment means for a subscriber terminal may be characterized by three modes of operation: a calling mode of operation wherein it is in the process of operatively interconnecting or has operatively interconnected the subscriber terminal and the first transmission track associated with the terminal; a called mode of operation wherein it is in the process of operatively interconnecting or has operatively interconnected the subscriber terminal and the second transmission track associated with the subscriber terminal; and a standby mode of operation wherein it is neither in the calling mode of operation or the called mode of operation.

Preferably, switching from one mode of operation to the other is controlled automatically. Line equipment means may typically include means responsive to a first instruction provided by the subscriber terminal to switch from its standby mode of operation to its calling mode of operation. Such instructions may be a simple tone modulating the transmitting carrier frequency of the subscriber terminal. At first instance, in the calling mode of operation, the line equipment may then typically receive an instruction identifying the subscriber terminal to which it is desired to place a call. Such identifying instruction may comprise, for example, a sequence of coded tones modulating the transmitting carrier frequency of the subscriber terminal.

Likewise, line equipment means may typically include means responsive to an instruction received from the associated second transmission track to switch from the standby mode of operation to a called mode of operation. Typically, such instruction may comprise the presence of a carrier frequency signal, for example, a communications carrier frequency signal or, where code input signals to define a path through the path routing arrangement appear on a continuous code carrier frequency in such path, then such code carrier frequency.

A function of line equipment means is to maintain a suitable division between carrier frequencies of communications signals to and from the subscriber terminal and to and from the path routing arrangement. Of course, the required division of carrier frequency depends on the character of the intelligence being transmitted. In a typical audio/video communication system, carrier frequencies may be divided by ten MHZ, the first 0 to 6 MHZ of baseband used for colour video transmission and a 7.5 MHZ frequency within the baseband being used as an audio sub-carrier frequency. In this case, the 10 MHZ separation of carrier frequencies is clearly more than sufficient to maintain separation between communications signals on the carriers.

To maintain such separation, the line equipment means includes means operative to translate, where necessary, the frequency of a carrier signal appearing as a first input from a subscriber terminal, a first transmission track, or a second transmission track, as the case may be, in such manner that the carrier frequency of the signal provided, as an output in response to such first input is divided from the carrier frequency appearing as a second input at such output. As will be seen in the detailed description, there are various ways by which the line equipment means may effect such frequency translation. Depending upon the particular way selected, frequency translation may not be necessary for a given direction of transmission in a given mode of operation.

The foregoing and other features of the present invention will now be described with reference to the drawings in which:

FIG. 1 is a perspective view symbollically illustrating a portion of a path routing arrangement for use in a system interconnecting 10,000 subscriber terminals.

FIG. 2a symbollically illustrates one transmission path through the path routing arrangement of FIG. 1.

FIG. 5a illustrates a modification to the circuit of FIG. 5 whereby the coded input signal is required to include additional audio tones to operate the transmission gate.

FIG. 6 illustrates typical waveform at various points during the operation of the circuit of FIG. 5.

FIG. 14 illustrates a conventional resistive hybrid circuit for the circuits of FIGS. 9 and 13a.

DETAILED DESCRIPTION

Figure 1:
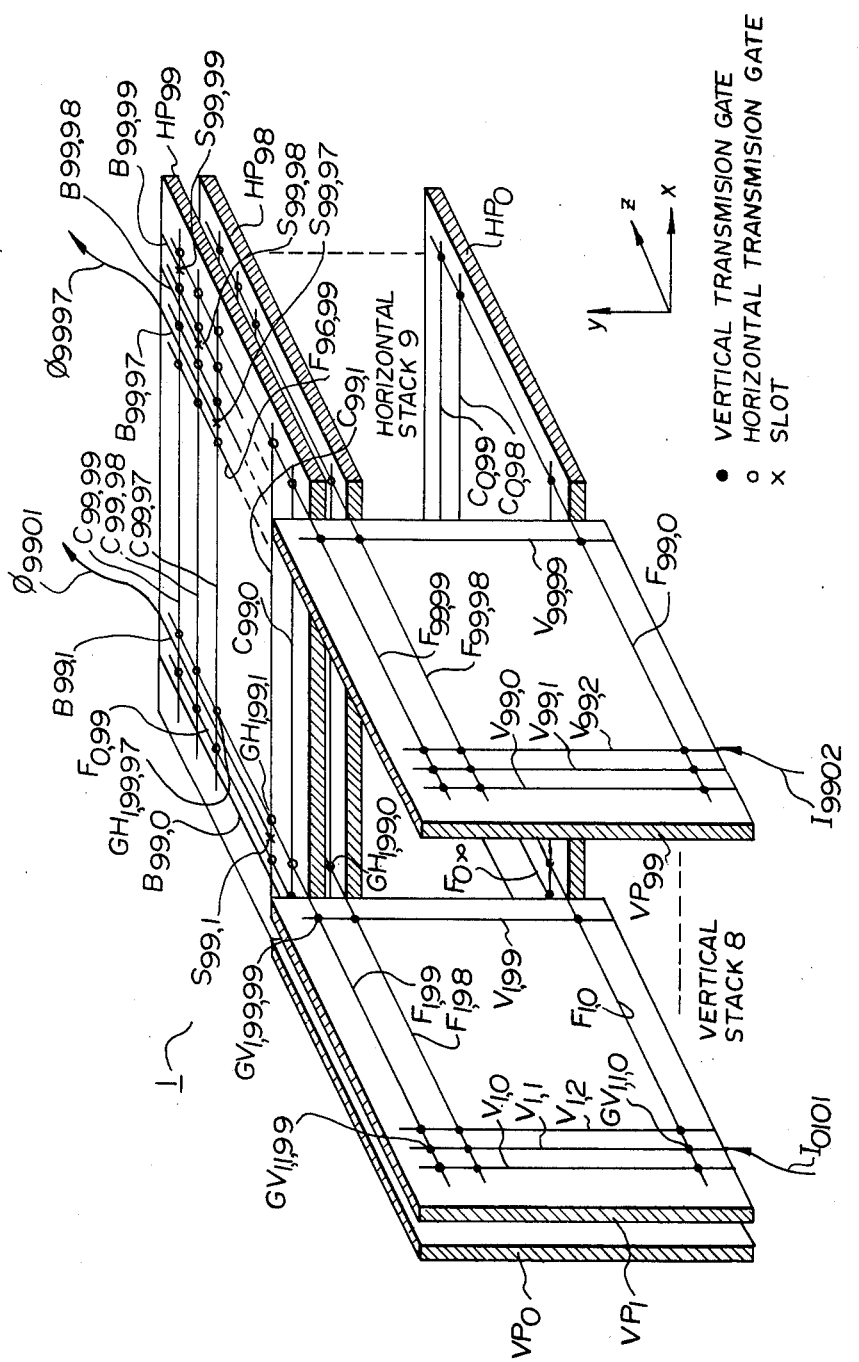

FIG. 1 shows an illustrative embodiment, in simplified form, of a path routing arrangement 1 providing a plurality of bi-directional transmission paths for conditionally establishing carrier communication links between a plurality of incoming lines and a plurality of outgoing lines. The communication links that are established are between given ones of the incoming lines (for example, lines $I_{0101}$ and $I_{9902}$ in FIG. 1) and desired ones of the outgoing lines (for example, lines $\phi_{9901}$ and $\phi_{9997}$ in FIG. 1). Thus, an incoming line may be thought of as being associated with a calling party who desires to communicate with a called party associated with an outgoing line.

Figure 10:
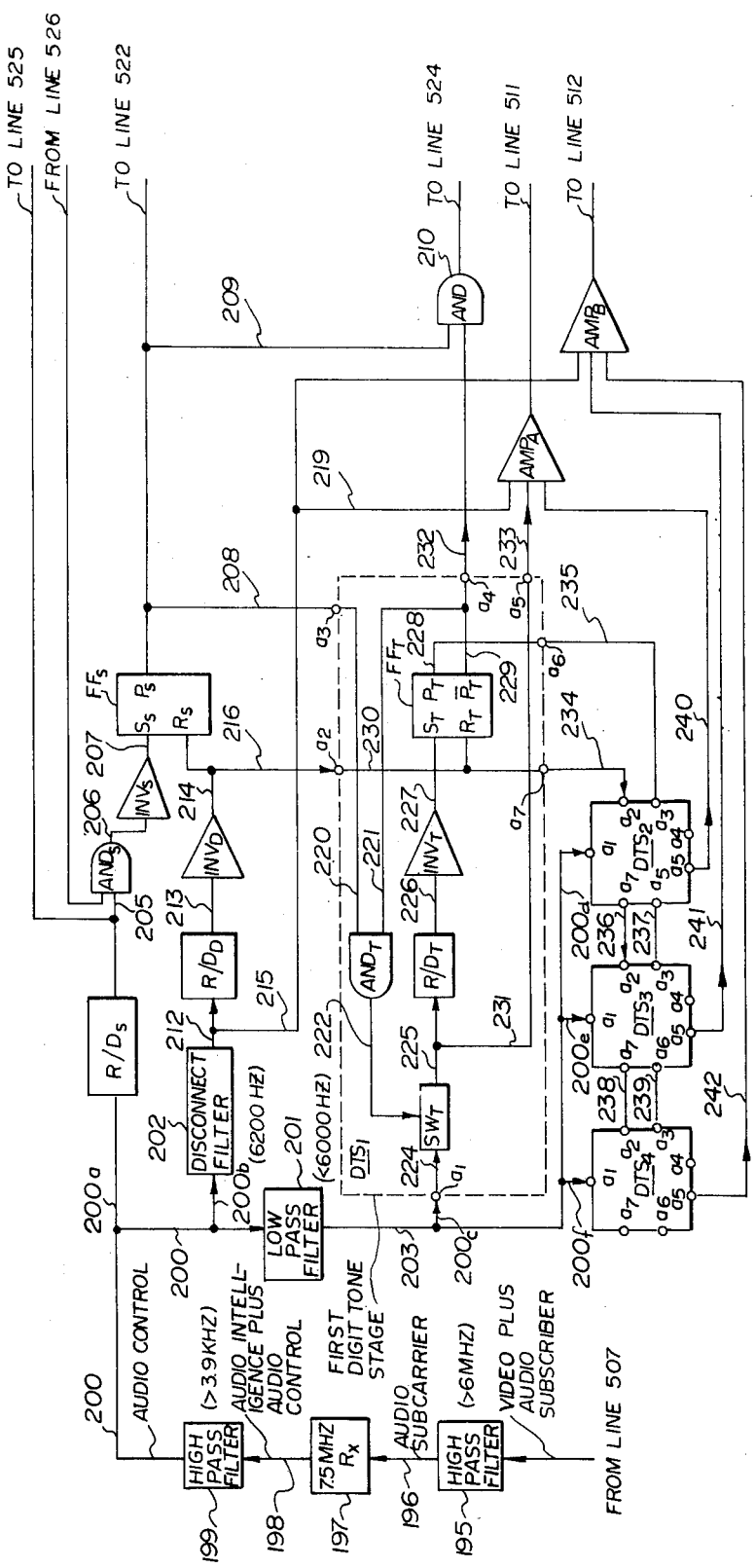
FIG. 10 is a detailed circuit diagram of the calling control circuit of FIG. 9.

In the embodiment shown in FIG. 1, it has been assumed for purposes of illustration that the path routing operations are to be performed between 10,000 incoming bi-directional transmission paths $I_{0000}, I_{0001}, \ldots, I_{9999}$ and 10,000 outgoing bi-directional transmission paths $\phi_{0000}, \phi_{0001}, \ldots, \phi_{9999}$ (only paths $I_{0101}$, $I_{9902}$, $\phi_{9901}$ and $\phi_{9997}$ being shown). The figure 10,000 is somewhat arbitrary but facilitates comparison with conventional 10,000 line switches used in common telephone systems. Also, as will become apparent, since 10,000 is a multiple of 10, the more familiar decimal system of counting can be used as the basis of a geometric order to the arrangement.

Between any given incoming line I and any given outgoing line $\phi$ there is a unique and self-contained transmission path, each path including transmission "tracks ∞ and two transmission "gates". Thus, for example, the transmission path between path $I_{0101}$ and path $\phi_{9997}$ includes vertical transmission track $V_{1,1}$, vertical transmission gate $GV_{1,1,99}$, front horizontal transmission track $F_{1,99}$, horizontal transmission gate $GH_{1,99,97}$ and cross horizontal transmission track $C_{99,97}$. The path as shown also includes "slot" $S_{99,97}$ and back horizontal track $B_{99,97}$.

In general, as can be seen in FIG. 1, the path routing arrangement comprises a vertical stack 8 of vertical platforms $VP_p$ ($p=0,99$) lying in y-z planes and a horizontal stack 9 of horizontal platforms $HP_r$ ($r=0,99$) lying in x-z planes.

Each vertical platform $VP_p$ ($p=0,99$) includes a plurality of vertical transmission tracks $V_{pq}$ ($p=0,99$; $q=0,99$) spaced parallel to each other and extending vertically (in the y-direction) on the platform.

Each horizontal platform $HP_r$ includes a plurality of back horizontal tracks $B_{rs}$, a plurality of cross horizontal tracks and a plurality of slots $S_{rs}$ ($r=0,99$; $s=0,99$). The cross horizontal transmission tracks $C_{rs}$ are spaced parallel to each other and extend horizontally (in the x-direction across the horizontal platform $HP_r$). For each cross horizontal transmission track $C_{rs}$ there is one corresponding slot $S_{rs}$ from which extends in the z-direction a corresponding back horizontal transmission track $B_{rs}$, the slots of differing cross horizontal tracks on the same platform being disposed relative to each other in the x-direction such that the corresponding back horizontal tracks are evenly spaced in the x-direction.

For each vertical transmission track $V_{pq}$ ($p=0,99$; $q=0,99$) on a vertical platform $VP_p$ ($p=0,99$) and each cross horizontal transmission track $C_{rs}$ ($r=0,99$; $s=1,99$) on a horizontal platform $HP_r$ ($r=1,99$), there is a corresponding front horizontal transmission track $F_{pr}$ ($p=0,99$; $r=0,99$) which extends in the z-direction across the vertical platform $VP_p$ ($p=0,99$) and the horizontal platform $HP_r$ ($r=0,99$). On the vertical platform $VP_p$ the track $F_{pr}$ is interconnected to each vertical transmission track $V_{pq}$ by a vertical transmission gate $GV_{pqr}$. On the corresponding horizontal platform $HP_r$, the track $F_{pr}$ is interconnected to each cross horizontal transmission track $C_{rs}$ by a horizontal transmission gate $GH_{prs}$. As can be seen in FIG. 1, the portions of the front horizontal tracks $F_{pr}$ on a horizontal platform $HP_r$ alternate in parallel with back horizontal tracks $B_{rs}$ on the same platform.

Elements bearing the generalized subscripts p, q, r, s are not shown as such in FIG. 1. Instead, only three vertical platforms $VP_0$, $VP_1$ and $VP_{99}$ and three horizontal platforms $HP_0$, $HP_{98}$ and $HP_{99}$ together with some of the transmission tracks, gates and slots on each are shown. However, the basic geometry of the overall structure becomes readily apparent on consideration of FIG. 1. Each vertical platform $VP_p$ includes 10,000 vertical transmission gates $GV_{pqr}$ ($q=0,99$, $r=0,99$) forming a 100 × 100 matrix of interconnections between 100 vertical transmission tracks $V_{pq}$ ($q=0,99$) and 100 front horizontal transmission tracks $F_{pr}$ ($r=0,99$) — and there are 100 vertical platforms $VP_p$ ($p=0,99$). Each horizontal platform $HP_r$ includes 10,000 horizontal transmission gates $GH_{prs}$ ($p=0,99$; $s=0,99$) forming a 100 × 100 matrix of interconnections between 100 cross horizontal transmission tracks $C_{rs}$ ($s=0,99$) and 100 front horizontal transmission tracks $F_{pr}$ ($p=0,99$) — and there are 100 horizontal platforms $HP_r$ ($r=0,99$). On a particular horizontal platform $HP_r$ there are 100 slots $S_{rs}$ ($s=0,99$) forming a diagonal of 100 interconnections between 100 cross horizontal transmission tracks $C_{rs}$ ($s=0,99$) and 100 back horizontal transmission tracks $B_{rs}$ ($s=0,99$).

It will be recognized on referring to FIG. 1 that although a complete transmission path through path routing arrangement 1 between a given incoming line and a given outgoing line is unique, portions of the front horizontal transmission track which is part of such path are necessarily common to other transmission paths through the arrangement. For example, the portion of front horizontal transmission track $F_{1,99}$ between vertical transmission gate $GV_{1,99,99}$ on vertical platform $VP_1$ and horizontal transmission gate $GH_{1,99,0}$ on horizontal platform $HP_{99}$ is common to every path between vertical transmission tracks $V_{1,0}, V_{1,1}, \ldots, V_{1,99}$ and cross horizontal transmission tracks $C_{99,0}, C_{99,1}, \ldots, C_{99,99}$.

Figure 2A:
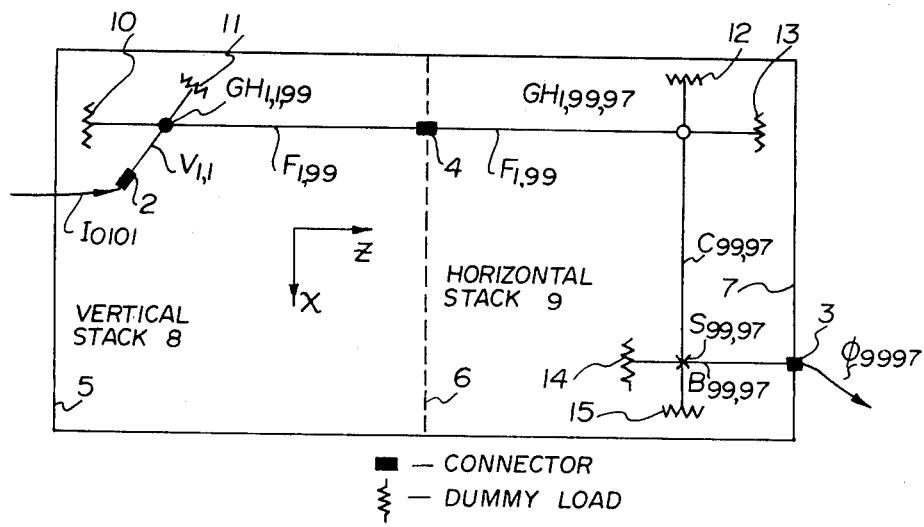
FIG. 2b illustrates an alternative arrangement for one path through a path routing arrangement generally similar to the path routing arrangement of FIG. 1.

FIG. 2a illustrates some additional aspects of the transmission paths of path routing arrangement 1 of FIG. 1. Ordinarily, the arrangement 1 will be contained in a rectangular enclosure which can be thought of as having a front wall 5 and a back wall 7 each opposed on opposite sides of a stack dividing plane 6 which plane divides the vertical stack 8 from the horizontal stack 9. The vertical stack 8 is between the front wall 5 and the stack dividing plane 6; the horizontal stack 9 is between the back wall 7 and stack dividing plane 6.

By way of example FIG. 2a shows the transmission path between incoming line $I_{0101}$ and outgoing line $\phi_{9997}$ including the same elements $V_{1,1}, F_{1,99}, C_{99,97}, B_{99,97}, GV_{1,1,99}, GH_{1,99,97}$ and $S_{99,97}$ as are shown in FIG. 1. In addition, the transmission path is now shown to include connectors 2, 3 and 4. Connectors 2 and 3 respectively serve the obvious purpose of means of connecting incoming line $I_{0101}$ and outgoing line $\phi_{9997}$ to the transmission path. Connector 4 which is included as part of front horizontal transmission track $F_{1,99}$ exemplifies a preference that in general the portion of a front horizontal track on a vertical platform be separable from the corresponding portion of the front horizontal track on a horizontal platform. Thereby, individual platforms may more readily be removed from the stack in which they appear.

Also, in FIG. 2a it can be seen that the ends of respective transmission tracks $V_{1,1}, F_{1,99}, C_{99,97}$, and $B_{99,97}$ (except where they terminate at a connector) are terminated by dummy loads 11, 10 and 13, 12 and 15, and 14 respectively. Preferably such loads are included where there would otherwise be an impedance mismatch causing undesirable reflections of signals carried in the paths.

Each transmission track of path routing arrangement 1 is a coaxial line suitable to concurrently carry several frequency channels of carrier intelligence, each channel having a predetermined bandwidth and being separated in frequency from the other channels by a predetermined amount. For purposes of illustration, it will be assumed that path routing arrangement 1 is for use in conjunction with an audio/video communications system wherein a communications carrier entering the arrangement from an incoming line may occupy any one of a first group of 10 predetermined "LOW" channels, and wherein a communications carrier entering the arrangement from an outgoing line may occupy any one of a second group of ten predetermined "HIGH" channels; as follows:

TABLE A

| LOW CHANNEL (from incoming line) | CARRIER FREQUENCY (MHZ) | HIGH CHANNEL (from outgoing line) | CARRIER FREQUENCY (MHZ) |
|---|---|---|---|
| 1 | 100 | 1 | 200 |
| 2 | 110 | 2 | 210 |
| 3 | 120 | 3 | 220 |
| 4 | 130 | 4 | 230 |
| 5 | 140 | 5 | 240 |
| 6 | 150 | 6 | 250 |
| 7 | 160 | 7 | 260 |
| 8 | 170 | 8 | 270 |
| 9 | 180 | 9 | 280 |
| 0 | 190 | 0 | 290 |

As is known, the loss per foot of a coaxial line generally increases as frequency increases and generally decreases as the diameter of the line increases. Hence there will be a trade-off to be made between loss and the physical diameter of the tracks. For the range of frequencies shown in TABLE A it is considered that an 0.25 inch coaxial line with polyvinyl or polyethylene dielectric does not present undue loss.

As can be seen, each channel has available a 10 MHZ baseband which is sufficient to allow, for example, the first 0 to 6 MHZ to be available for color video intelligence transmission and 7.5 MHZ to be available for audio subcarrier transmission.

The reasons for a selection of 20 channels as shown in Table A will become apparent hereinafter, but it is to be understood that a limitation to 20 channels is not a necessary limitation.

Thus, for example, on the transmission path between incoming line $I_{0101}$ and outgoing line $\phi_{9997}$ as shown in FIG. 1 or 2a, a communications carrier occupying one channel could be carried from line $I_{0101}$ over vertical transmission track $V_{1,1}$ to gate $GV_{1,1,99}$; through gate $GV_{1,1,99}$ (presuming the gate is "open"); from Gate $GV_{1,1,99}$ over front horizontal transmission track to gate $GH_{1,99,97}$; through gate $GH_{1,99,97}$ (presuming this gate is also open); from gate $GH_{1,99,97}$ over cross horizontal track $C_{99,97}$ to slot $S_{99,97}$; through slot $S_{99,97}$; and from slot $S_{99,97}$ over back horizontal transmission track $B_{99,97}$ to outgoing line $\phi_{9997}$ — and, a communications carrier occupying another channel could be carried in the opposite direction from line $\phi_{9997}$ to line $I_{0101}$.

As may now be apparent, slot $S_{99,97}$ and the corresponding back horizontal transmission track $B_{99,97}$ merely serve to physically orientate the transmission path so that the connection of outgoing line $\phi_{9997}$ is through the back wall 7 (FIG. 2a of the path routing arrangement. The slot $S_{99,97}$ forms a direct electrical connection between cross horizontal transmission track $C_{99,97}$ and back horizontal transmission track $B_{99,97}$ and ideally presents no loss to electrical signals. The same is true of all slots $S_{rs}(r=0,99; s=0,99)$. Their use, together with their corresponding back horizontal transmission tracks $B_{rs}(r=0,99; s=0,99)$ is a possible means of mechanically directing each transmission path of the path routing arrangement 1 to the back wall.

Figure 3:
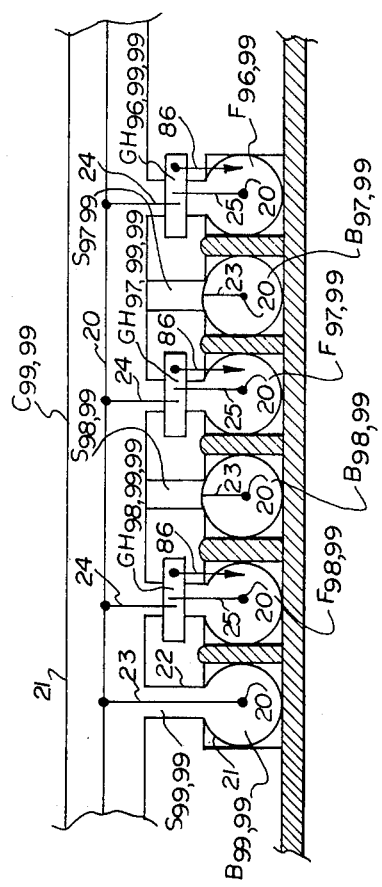
FIG. 3 illustrates a typical interconnection between a portion of a cross horizontal transmission track of FIG. 1 and back and front horizontal transmission tracks of FIG. 1.

A mechanical configuration for a slot for a coaxial line arrangement is shown in FIG. 3 which, by way of example illustrates that portion of cross horizontal transmission track $C_{99,99}$ extending from slot $S_{99,99}$ associated therewith to horizontal gate $GH_{96,99,99}$ also associated therewith. The view shown may be considered as a section taken along the centre line of track $C_{99,99}$ when looking at the path routing arrangement 1 of FIG. 1 from the back. The inner conductor 20 of track $C_{99,99}$ is thus exposed to view. Likewise, end views of the inner conductors 20 of tracks $B_{99,99}, F_{98,99}, B_{98,99}, F_{97,99}, B_{97,99}$ and $F_{96,99}$ are exposed to view.

As shown in FIG. 3 the slots $S_{99,99}$ merely comprise an inner conductor 23 joining inner conductor 20 of track $C_{99,99}$ to inner conductor 20 of track $B_{99,99}$ and an outer conductor 22 joining outer conductor 21 of track $C_{99,99}$ to outer conductor 21 of track $B_{99,99}$. There is thus formed a direct low impedance electrical connection. In the z-direction (see FIG. 1) the slots $S_{98,99}$ and $S_{97,99}$ are disposed behind track $C_{99,99}$ and thus the inner conductors 23 of those slots are only partially exposed in FIG. 3.

The horizontal transmission gates in FIG. 3 are shown in a symbolic form and will be discussed in more detail hereinafter.

Figure 2B:
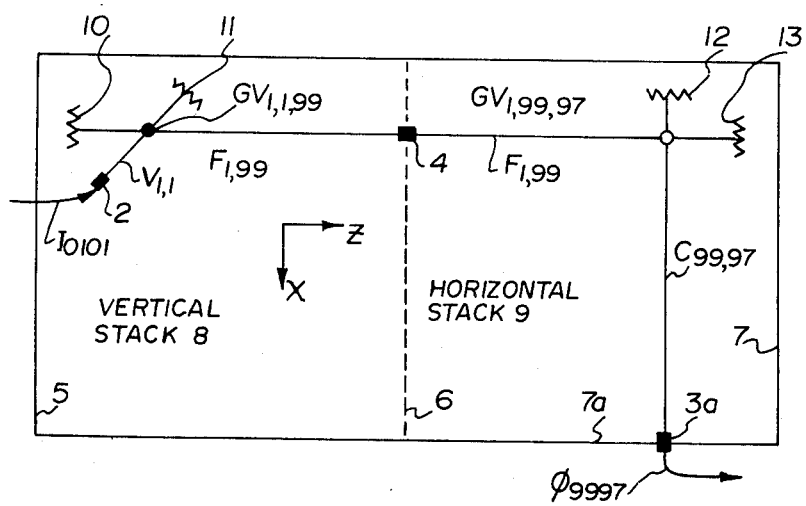

As an alternative to the use of slots and back horizontal transmission tracks and assuming mechanical considerations do not otherwise dictate, a cross horizontal transmission track may connect directly to an outgoing line. By way of exaple, FIG. 2b illustrates cross horizontal transmission track $C_{99,97}$ connecting directly through connector 3a at sidewall 7a to outgoing line $\phi_{9997}$. Although not shown in the drawings, it will also be appreciated that connection of an incoming line to a vertical track — rather than in the manner indicated in FIGS. 2a and 2b — could be by way of a slot interconnecting the vertical track and an additional transmission track extending from the slot to the front wall 5 (see FIG. 2a or 2b) to join the incoming line through a suitable connector.

Referring now to FIG. 1, the vertical and horizontal transmission gates in the transmission path between a given incoming line and a given outgoing line are normally closed preventing the transmission path from passing communication carriers in either direction. A carrier communication link is established over the transmission path only if both the vertical transmission gate and the horizontal transmission gate are opened in response to suitable control signals.

The transmission gates of a path routing arrangement may comprise manually operated switches making or breaking an electrical connection between transmission tracks. However, particularly for large path routing arrangements compactly arranged such as that shown in FIG. 1, it is clearly preferable that the transmission gates be automatically remotely controlled. There are of course various means whereby such control may be achieved, but there is one particular method that does not require the use of separate control line inputs to the path routing arrangement for the sole purpose of operating the transmission gates. Instead, the gates between a particular incoming line and a desired outgoing line may be controlled by a suitable control signal input from the incoming line to the vertical transmission track associated therewith. Electrical continuity exists in a transmission track of path routing arrangement 1 even if all transmission gates on the track happen to be closed, thus, if such is the case, a control signal input to the transmission track is nevertheless carried along the track and can be used to close a selected gate depending on the character of the signal. Accordingly, for example, a suitable control signal input from line $I_{0101}$ in FIG. 1, 2a or 2b to vertical transmission track $V_{1,1}$ could first travel along vertical transmission track $V_{1,1}$ to cause vertical transmission gate $GV_{1,1,99}$ to close in response thereto, and then continue along front horizontal transmission track $F_{1,99}$ to cause horizontal gate $GH_{1,99,97}$ to close in response thereto.

Figure 4:
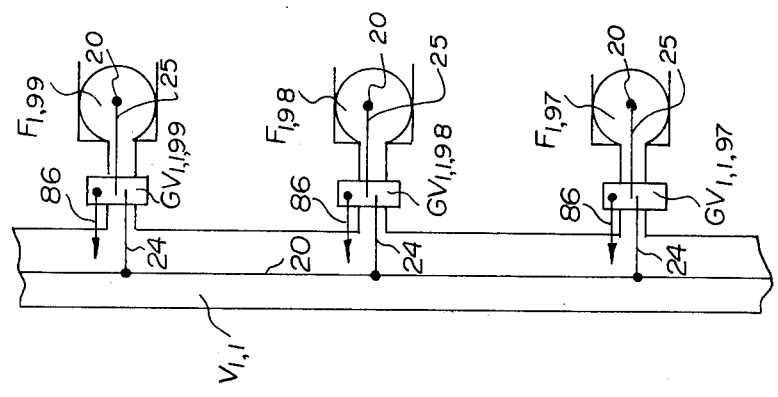
FIG. 4 illustrates a typical interconnection between a portion of a vertical transmission track of FIG. 1 and front horizontal transmission tracks of FIG. 1.

FIGS. 3 and 4 symbollically depict transmission gates that open in response to suitable control signals carried by a transmission track. FIG. 4 illustrates that portion of vertical transmission track $V_{1,1}$ extending from vertical transmission gate $GV_{1,1,97}$ (not shown in FIG. 1) to vertical transmission gate $GV_{1,1,99}$. The view shown may be considered as a section taken along the centre line of track $V_{1,1}$ when looking at path routing arrangement 1 of FIG. 1 from the front. The inner conductor 20 of track $V_{1,1}$ is thereby exposed to view as are end views of the inner conductors 20 of front horizontal transmission tracks $F_{1,97}$, $F_{1,98}$ and $F_{1,99}$.

In the case of FIG. 4, control signals to open a selected vertical gate are carried by vertical transmission track $V_{1,1}$. Each vertical gate includes means responsive to open the gate if the control signal has the particular character to which the gate is designed to so respond. In FIG. 4 the vertical gates are shown in their normally closed position — that is, there is no continuity between their gate contact line 24 connected to inner conductor 20 of vertical transmission track $F_{1,1}$ and their gate contact line 25 connected to inner conductor 20 of the corresponding front horizontal transmission track $F_{1,97}$, $F_{1,98}$ or $F_{1,99}$, as the case may be. Thus in this condition, electrical signals are not able to pass from vertical transmission track $V_{1,1}$ to one of the front horizontal transmission tracks shown.

Each vertical gate in FIG. 4 is also shown to include a signal detection means or probe 86 which senses the character of control signals that appear in vertical transmission track $V_{1,1}$. In response to detection by the probe 86 of the appropriate control signal for a given vertical gate, electrical continuity is formed between gate contact lines 24 and 25 of the particular vertical gate. Then, the contact lines 24 and 25 of a particular vertical gate, which contacts are symbollically spaced apart in FIG. 4, can be thought of as symbollically joined to form a direct electrical connection between inner conductor 20 of track $V_{1,1}$ and inner conductor 20 of the front horizontal transmission track corresponding to the particular vertical gate.

For selectively opening any one of the 100 vertical transmission gates $GV_{pqr}$ ($r=0,99$) on a given vertical transmission track $V_{pq}$, it is necessary that each such gate be responsive to a control signal different from the control signals that open other ones of such gates. In other words, a control signal must be coded to open a particular vertical gate and the particular gate must be coded to open in response to that particular coded control signal.

In the case of FIG. 3, the control signals to open the horizontal gates are carried by the front horizontal transmission tracks associated with the gates. Thus, for example, the control signal to open horizontal gate $GH_{96,99,99}$ is carried by front horizontal transmission track $F_{96,99}$. Of course, this control signal will have gained access to track $F_{96,99}$ through any one of the 100 vertical transmission gates $GV_{96,q,99}$ ($q=0, 99$) interconnecting track $F_{96,99}$ with vertical transmission tracks $V_{96,q}$ ($q=0,99$) on vertical platform $VP_{96}$.

Generally, the horizontal transmission gates are selected to open in the same manner as described for vertical transmission gates. For selectively opening any one of 100 horizontal transmission gates $GH_{prs}$ ($s=0,99$) on a given front horizontal transmission track $F_{pr}$, it is necessary that each such gate be coded to open in response to a coded control signal distinct from the coded control signals that open the other horizontal gates on the track.

Accordingly, it will be concluded that to establish a desired communication link in the manner aforesaid, the control signal input from an incoming line must be coded to open a particular vertical gate and a particular horizontal gate. One technique for coding the control signal is to superimpose "out-of-band" audio tons on predetermined control signal carrier frequencies, the tones being superimposed in a sequence representing the digits that identify the outgoing line with which it is desired to establish a communication link.

For purposes of illustration it will be assumed that digits are represented by single frequency audio tones as appears in Table B following:

TABLE B

| DIGIT | TONE FREQ. (HZ) | DIGIT | TONE FREQ. (HZ) |
|---|---|---|---|
| 0 | 4000 | 5 | 5000 |
| 1 | 4200 | 6 | 5200 |
| 2 | 4400 | 7 | 5400 |
| 3 | 4600 | 8 | 5600 |
| 4 | 4800 | 9 | 5800 |

The particular tones selected are so called "out-of-band" audio tones because, while they are within the audio range of frequencies, they are above the usual voice frequency range of communications systems.

Tones to open vertical transmission gates will be superimposed on a 1 MHZ carrier frequency and tones to open horizontal transmission gates will be superimposed on a 2 MHZ carrier frequency.

The selection of 1 MHZ and 2 MHZ carriers is made because these frequencies are outside the frequency range of communications carriers and because the circuitry of the vertical and horizontal transmission gates can be made much smaller in size than, for example, the circuitry that would be required to detect tones superimposed on the communication carriers which, as will be recalled, may occupy any one of ten channels together spanning a broad range of frequencies. Also, these frequencies are sufficiently high to avoid the generation of currents on the outer surface of the coaxial tracks causing interference.

The selection of tone frequencies is somewhat arbitrary. The tones could, for example, lie in the voice frequency range rather than an out-of-band range and could, for example, comprise tonee with two frequency components as are used in some common telephone systems. However, if voice frequency tones are used, additional care may be needed to ensure that the means providing the control signals to the path routing arrangement does not behave in a manner such that undesirable false tones would be provided in response to voice frequency intelligence.

Referring now to FIG. 1, 2a or 2b, if, for example, the tones 5,800 HZ and 5,800 HZ appear in sequence (ie. the digit sequence 9-9) superimposed on a 1 MHZ carrier frequency and then the tones 5,800 HZ and 5,400 HZ appear in sequence (ie. the digit sequence 9-7) on a 2 MHZ carrier frequency, all of which appear as an input control signal from line $I_{0101}$ to vertical transmission track $V_{1,1}$, then, the sequence 5,800 HZ —5,800 HZ -5,800 HZ -5,400 HZ (ie. 9-9-9-7) has identified outgoing line $\phi_{9997}$. If vertical transmission gate $GV_{1,1,99}$ is coded to open in response to the digit sequence 9-9 on a 1 MHZ carrier and if horizontal transmission gate $GH_{1,99,97}$ is coded to open in response to the digit sequence 9-7 on a 2 MHZ carrier, both gates will be open when the entire sequence 9-9-9-7 is completed and a link for carrier communications between incoming line $I_{0101}$ and outgoing line $\phi_{9997}$ will thereby be established.

Figure 5:
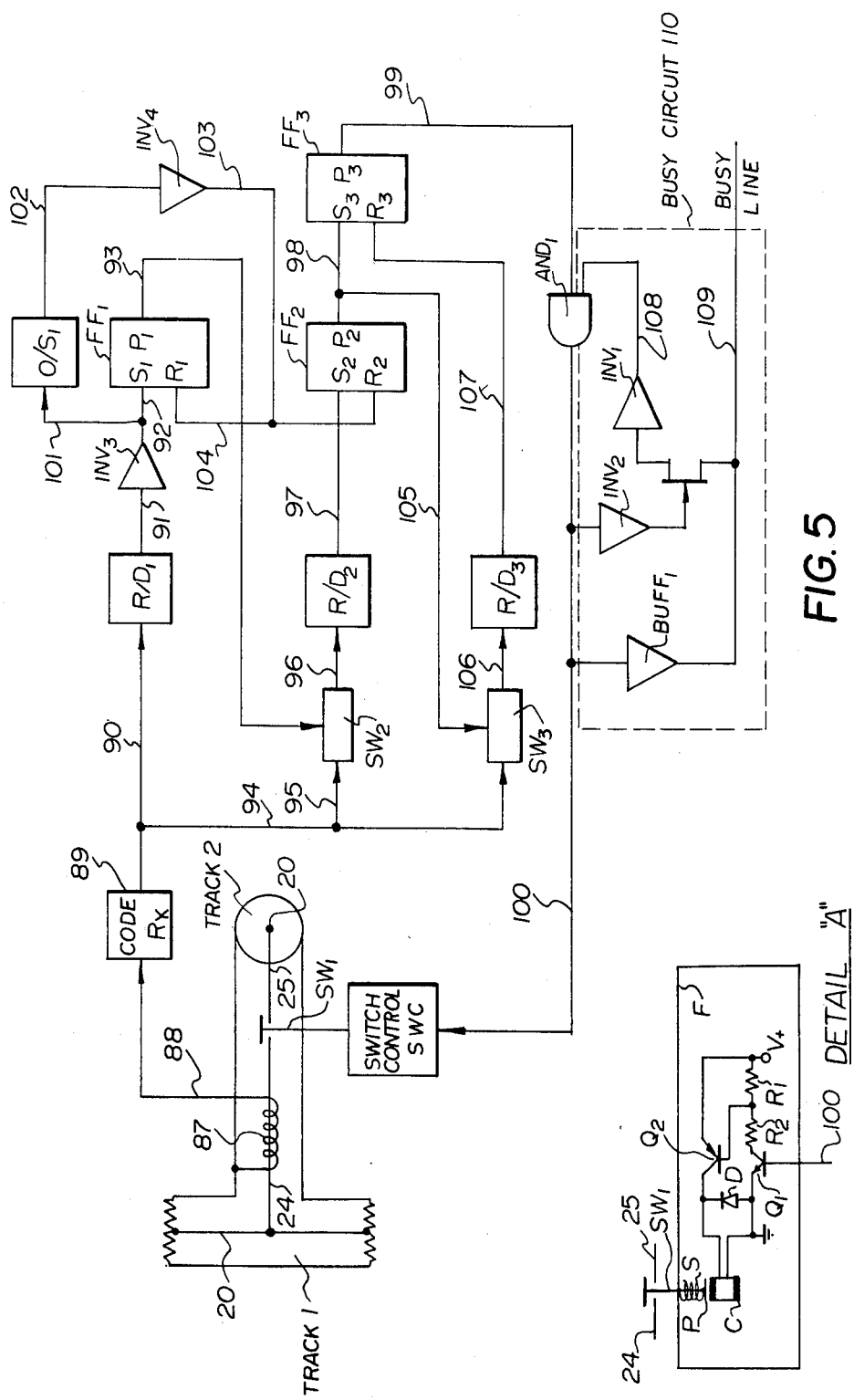
FIG. 5 is a circuit diagram of a transmission gate which responds to input signals coded by audio tones appearing in a transmission track.

A circuit for a transmission gate which opens in response to suitable coded carrier signals appearing in a transmission track is shown in FIG. 5. As will become apparent, the circuit also includes means to close the gate in response to suitable coded carrier signals appearing in the transmission track. Once having decided to use a transmission track to carry signals to open the gate it is considered that it would be preferable to also use means to close the gate in response to signals appearing in a transmission track. Of course, other means could be used.

Since the basic structure of every vertical and horizontal transmission track may be basically the same, TRACK 1 of FIG. 5 may be considered as a vertical transmission track with TRACK 2 being a front horizontal transmission track, or, TRACK 1 may be considered as a front horizontal transmission track with TRACK 2 being a cross horizontal transmission track. If TRACK 1 is considered as a vertical transmission track, then code receiver 89 is tuned to receive 1 MHZ carrier frequencies as an input on line 88 from sensing coil 87 which detects signals on gate contact line 24. Similarly, if TRACK 2 is a front horizontal transmission track, then code receiver 89 is tuned to receive 2 MHZ carrier frequencies. In either case, the output of code receiver 89 on line 90 (which also appears on lines 94 and 95) is simply the audio tone that is superimposed on the carrier.

The design of receivers such as code receiver 89 which received a modulated carrier frequency input signal and produces as an output the modulating frequency is very well known in the art and will not be discussed in detail. The same is true of many other circuit elements which will be referred to hereinafter with reference to FIG. 5 and other FIGURES. These elements include receiver detectors (R/D) which receive an ac input and produce a dc logic signal as an output if the input frequency is the frequency or frequency range for which the receiver is tuned; flip-flops; multivibrators; and other common circuit elements.

Referring again to FIG. 5, the normal condition of the circuit is that normally open switch $SW_1$ between gate contact lines 24 and 25 is open as shown. Thus the transmission gate as a whole is normally closed and does not permit electrical signals to pass between TRACK 1 and TRACK 2. Switch $SW_1$ remains open so long as the control signal input on line 100 to the switch control SWC, which control mechanically drives switch $SW_1$, remains at logical 0. If such control signal input goes to logical 1, switch control SWC closes switch $SW_1$ making electrical contact between gate contact lines 24 and 25 and therefore between line 20 of TRACK 1 and line 20 of TRACK 2. The transmission gate is then open.

Detail "A" of FIG. 5 illustrates a basic circuit to energize a relay coil C of switch control SWC to cause switch $SW_1$ to close. A logical 1 input to the base of transistor $Q_1$ to turn on. When transistor $Q_1$ is on, the bias across resistor $R_1$ produced by the voltage divider action of resistors $R_1$ and $R_2$ biases transistor $Q_2$ on allowing current to flow from voltage source V+ through coil C energizing the coil. The bottom plate P of switch $SW_1$ is then magnetically drawn towards coil C against the action of spring S attached to the plate P and the frame F of switch control SWC. When the input on line 100 goes to logical 0, transistors $Q_1$ and $Q_2$ are off and the coil C is de-energized. Diode D suppresses inductive switching spikes on turn-off.

As can be seen in FIG. 5, the circuit of the transmission gate includes three flip-flops $FF_1$, $FF_2$ and $FF_3$. These flip-flops are of the edge triggered set-reset variety each having a set input $S_1$, $S_2$ or $S_3$ as the case may be, a reset input $R_1$, $R_2$ or $R_3$ as the case may be, and a set output $P_1$, $P_2$ or $P_3$ as the case may be. The logical state of a set output depends on whether the flip-flop last received a set command on its set input or a reset command on its reset input. Herein, it is assumed that all set-reset flip-flops are so designed that a set or reset command, as the case may be, is a switching transition from logical 0 to logical 1.

The normal logical state of set outputs $P_1$, $P_2$ and $P_3$ of flip-flops $FF_1$, $FF_2$ and $FF_3$ respectively is logical 0. As can be seen, the output $P_3$ of flip-flop $FF_3$ on line 99 is also one input of dual input logical "AND" gate $AND_1$. Thus, regardless of the logical state of the other input to gate $AND_1$ on line 100, switch $SW_1$ will be logical 0 of output $P_3$ of flip-flop $FF_3$ is logical 0.

The normal condition of switches $SW_2$ and $SW_3$ appearing in FIG. 5 is also open. That is, when the input to switch $SW_2$ from output $P_1$ of flip-flop $FF_1$ on line 93 is logical 0, switch $SW_2$ is open; when such input is logical 1, the switch is closed. Likewise, when the input to $SW_3$ from output $P_2$ of flip-flop $FF_2$ via lines 98 and 105 is logical 0, switch $SW_3$ is open; when such input is logical 1, the switch is closed.

The circuit of FIG. 5 includes three receiver detectors $R/D_1$, $R/D_2$, and $R/D_3$, the first of which is for detecting the first audio tone of the two tones required to identify the gate, the second of which is for detecting the second audio tone of the two tones required to identify the gate, and the third of which is for detecting a DISCONNECT tone to cause the transmission gate to be closed. In this case, it will be assumed that a disconnect tone is a 6000 HZ out-of-band tone.

When the proper tone frequency is on line 90 at the input of receiver detector $R/D_1$, on line 96 at the input of receiver detector $R/D_2$, or on line 106 at the input of receiver detector $R/D_3$, as the case may be, the output of the receiver detector is logical 1 — otherwise it is logical 0. Thus, for example, if the transmission gate is coded to detect the tone sequence 4,600 HZ - 5,400 HZ (ie. the digit sequence 3-7), receiver detector $R/D_1$ is tuned to receive and detect a 4,600 HZ tone and receiver detector $R/D_2$ is tuned to receive and detect a 5,400 HZ tone. Receiver detector $R/D_3$ is tuned to receive and detect a 6,000 HZ tone. In each case it is assumed that all tones initially appear on the carrier frequency (1 MHZ or 2 MHZ, as the case may be) that code receiver 89 is tuned to receive.

As will be seen, the receiver detectors $R/D_1$ to $R/D_3$ and other receiver detectors referred to herein are used to control the switching of flip-flops and triggering one-shot multivibrators. Depending on the design of a receiver detector per se, the logical transition at its output in response to the beginning of or end of an ac signal at its input may not be sufficiently fast to cause switching or triggering of a following flip-flop or mulivibrator, as the case may be. Also, there may be undersirable ripple at the output of a receiver detector. Accordingly, it may then be necessary to insert a threshold device such as a Schmitt trigger at the output of the receiver detector.

To assist in describing the circuit shown in FIG. 5, reference will be made to FIG. 6 which shows typical waveforms at various points of the circuit. The DISCONNECT tone in FIG. 6 is shown with dashed lines because the waveforms are intended to indicate response both with (solid lines) a DISCONNECT tone.

When the 4,600 HZ first digit appears on line 90 at the input of receiver detector $R/D_1$, the output on line 91 to the input of logical inverter $INV_1$ goes to logical 1 as shown in FIG. 6. The output of inverter $INV_3$ on line 92 to input $S_1$ of flip-flop $FF_1$ goes to logical 0, but since this is a negative going transition from logical 1 to logical 0 there is no response by flip-flop $FF_1$. However, when the 4,600 HZ tone terminates, the output of receive detector $R/D_1$ on line 91 returns to logical 0 and the output of inverter $INV_3$ on line 92 returns to logical 1. Accordingly, there is a set command at the input $S_1$ of flip-flop $FF_1$ and its output $P_1$ on line 93 goes to logical 1 causing switch $SW_2$ to close.

When the 5,400 HZ second digit tone appears on line 96 at the input of receiver detector $R/D_2$ (via lines 90, 94, 95 and switch $SW_3$ which switch is now closed), the output on line 97 to input $S_2$ of flip-flop $FF_2$ goes to logical 1. Such transition at the input $S_2$ of flip-flop $FF_2$ is a set command to flip-flop $FF_2$ and its output $P_2$ on lines 98 and 105 goes to logical 1.

It might be noted that there is no inverter between the output of receiver detector $R/D_2$ and the input $S_2$ of flip-flop $FF_2$ corresponding to inverter $INV_3$ between the output of receiver detector $R/D_1$ and input $S_1$ of flip-flop $FF_1$. Inverter $INV_3$ performs a delay timing function that prevents switch $SW_3$ from closing before the first digit tone terminates. In this particular example where receiver detector $R/D_2$ is tuned to a different frequency (5,400 HZ) than the frequency (4,700 HZ) to which receiver detector $R/D_1$ is tuned, such a delay is not necessary and the output of $R/D_1$ could be taken directly to the input $S_1$ of flip-flop $FF_1$. Switch $SW_2$ would then close at the beginning of the 4,700 HZ tone. This tone would then appear on line 96 at the input of receiver detector $R/D_2$, but since $R/D_2$ is not tuned to 4,700 HZ, it would not respond. However, if the first and second digits that identified a transmission gate happened to be the same — for example 3-3 instead of 3-7 as in the present case — then both flip-flops $FF_1$ and $FF_2$ would be set by the first tone because receiver detectors $R/D_2$ would respond.

Returning again to the sequence of operation, when the output $P_2$ of flip-flop $FF_2$ goes to logical 1, a set command is provided on line 98 to set input $S_3$ of flip-flop $FF_3$. Thus, as shown in FIG. 6, the output $P_3$ of flip-flop $FF_3$ on line 99 goes to logical 1. If, as may occur, the output $P_3$ of flip-flop $FF_3$ was already at logical 1 then there would of course be no change. Also, as shown in FIG. 6 by the continuing solid line of the waveform for line 99, the output on line 99 remains at logical 1 so slong as no DISCONNECT tone arrives. Assuming for the moment that the input on line 108 to gate $AND_1$ is logical 1, the logical 1 condition on line 99 appears on line 100 causing switch $SW_1$ to close. The transmission gate is now open.

When the output $P_2$ of flip-flop $FF_2$ goes to logical 1, the output appears on line 105 via line 98 causing switch $SW_3$ to close. If a 6,000 HZ DISCONNECT tone then appears on line 90, it reaches the input of receiver detector $R/D_3$ via line 94 and switch $SW_3$ causing the output of $R/D_3$ on line 107 to go to logical 1. This transition is received on line 107 as a reset command to reset input $R_3$ of flip-flop $FF_3$ which causes the output $P_3$ of flip-flop $FF_3$ on line 99 to go to logical 0 (shown by dashed lines for line 99 in FIG. 6). This output also appears through gate $AND_1$ on line 100 as the input to switch control SWC. Since switch $SW_1$ is open for a logical 0 input, the transmission gate will now be closed.

In summary, to open the transmission gate it is necessary to provide the tones 4,600 HZ - 5,400 HZ in sequence. To close the gate it is necessary to provide the tones 4,600 HZ - 5,400 HZ - 6,000 HZ in sequence. Nothing has yet been said about the timing of tones in the sequences.

To enable the transmission gate to detect recurring sequences of the tones 4,600 HZ and 5,400 HZ, a timing circuit is included which causes flip-flops $FF_1$ and $FF_2$ to be reset a predetermined timed after the first tone (4,600 HZ) of the sequence is detected. The basic elements of the timing circuit as shown in FIG. 5 are one-shot multivibrator $O/S_1$ and logical inverter $INV_4$. It is assumed that one-shot multivibrator $O/S_1$ produces a logical 1 pulse having a predetermined pulse width in response to a negative going logical transition (logical 1 to logical 0) appearing at its input on line 101. The input on line 101 is also the output of inverter $INV_3$ on line 92. The output of $O/S_1$ is on line 102 to the input of inverter $INV_4$, the output of which inverter on line 103 is also the input on line 104 to reset inputs $R_1$, $R_2$ of flip-flops $FF_1$, $FF_2$ respectively.

As will be seen, the timing circuit is that the sequence of tones required to open or close the transmission gate must be completed within the duration of the logical 1 pulse of one shot multivibrator $O/S_1$. Typically, the duration of a tone may be of the order of 50 milliseconds and tones may be spaced 50 milliseconds apart, thus, if the one-shot multivibrator is triggered when the first digit tone is first detected (as the circuit shown in FIG. 5 is designed to do) rather than on termination of the first digit tone (as the circuit of FIG. 5 could obviously be modified to do), a pulse duration of 250 milliseconds would suffice for the circuit of FIG. 5 and leave a margin for timing fluctuations.

The operation of the timing circuit is as follows and again reference may be made to FIG. 6. When the output of inverter $INV_3$ appearing on line 101 via line 92 goes from logical 1 to logical 0, one shot-multivibrator $O/S_1$ is triggered producing at its output on line 102 a logical 1 pulse as shown in FIG. 6. The pulse width shown is somewhat greater in duration than need be and could terminate any time after the condition on line 99 as shown in FIG. 6 goes to logical 0.

Since the output of $INV_4$ on line 103 is the logical inverse of the condition on line 102, a logical 0 pulse appears on line 103. When the logical 0 pulse terminates a reset command is provided on line 104 from line 103 to the reset inputs $R_1$, $R_2$ of flip-flops $FF_1$, $FF_2$ respectively. Accordingly, the outputs $P_1$, $P_2$ of flip-flops $FF_1$, $FF_2$ respectively go to logical 0 as shown in FIG. 6 and switches $SW_2$, $SW_3$ are opened.

A further characteristic of the transmission gate that results from use of the timing circuit is that if the required first digit tone does not appear, but is followed buy a second digit tone other than the required second digit tone, flip-flop $FF_1$ will only be set for the duration of the output pulse of one-shop multivibrator $O/S_1$.

It is preferable that some means be included to prevent the opening of a transmission gate under certain circumstances. In FIG. 5 busy circuit 110 is a means which prevents the closure of switch $SW_1$ if the condition on line 99 goes to logical 1 when an input to busy circuit 110 on BUSY LINE 109 is logical 1. Busy circuit 110 includes buffer amplifier $BUFF_1$, two logical inverters $INV_1$ and $INV_2$ and field effect transistor $FET_1$. When the condition on line 100 is logical 0, the output of inverter $INV_2$ is logical 1 which closes $FET_1$ whereby the logical condition on BUSY LINE 109 becomes the input to inverter $INV_1$. Unless the condition on line 109 is forced to logical 1 by an external source applied as an input to the line, the logical condition on the line will be logical 0. The output of inverter $INV_1$ on line 108 will thus be logical 1. If the condition on line 109 is forced to logical 1, the output of $INV_1$ on line 108 will be logical 0 which in effect disables gate $AND_1$ such that switch $SW_1$ cannot be closed even if the proper sequence of tones are received by the transmission gate.

If there is no disabling busy condition and line 100 does go to logical 1, $FET_1$ will be open because the input thereto from inverter $INV_2$ will be logical 0. The input to inverter $INV_1$ will be logical 0 independent of the condition on line 109, thus the condition on line 108 at the output of inverter $INV_1$ will be logical 1 (as is requried to have the logical 1 condition at the output of gate $AND_1$ on line 100). Through buffer amplifier $BUFF_1$, the condition on line 109 becomes logical 1 which condition may become the "external source" referred to just previously except that it is the external source for corresponding BUSY LINES 109 of selected other transmission gates to which BUSY LINE 109 of the particular transmission gate shown in FIG. 5 is connected.

As will be seen, it is contemplated that in some embodiments of the path routing arrangement 1, the selective closing of transmission gates may require that a transmission gate be completely identified on its particular platform. Two tone identification as just discussed merely identifies a front horizontal transmission track on a given vertical platform. For example, the tone sequence 4,600 HZ (digit sequence 3-7) may identify vertical transmission gate $GV_{1,1,37}$ — that is, the 37th vertical transmission gate of vertical track $V_{1,1}$ on vertical platform $VP_1$. However, this tone sequence also identifies 99 other vertical transmission gates $GV_{1,q,37}$ ($q=0,2,3..,99$) on the 99 other vertical transmission tracks $V_{1,q}$ ($q=0,2,3,...,99$) connecting to the same front horizontal transmission track $F_{1,99}$ on the same vertical platform $VP_1$. To completely identify a vertical transmission gate on a given vertical platform (on which there are 10,000 gates), and assuming that tone sequences are used generally as aforesaid, then, a sequence of four tones will be sufficient. For example, the first two tones may identify the transmission gate for a given vertical transmission track, the last two tones may identify the transmission track itself (which track, for a given vertical platform, is identified by the last two digits of the number that identifies the associated incoming line).

As shown in FIG. 5a, the circuit shown in FIG. 5 may readily be modified to detect a sequence of more than two tones. FIG. 5a repeats (with addition of a logical inverter $INV_5$) the portion of FIG. 5 that detects the second tone of a sequence (indicated in FIG. 5a as STAGE 2) and the portion of FIG. 5 that detects a DISCONNECT tone on completion of a proper preceeding sequence of tones. Elements of FIG. 5a corresponding to elements of FIG. 5 have been identifed by the same characters. FIG. 5a shows in addition STAGES 3 ... N which stages are identical in structure to STAGE 2 and respond in the same manner as STAGE 2 except that their respective receiver detectors are tuned to respond to audio tones (ie. Table B tones) that may be different than the audio tone to which STAGE 2 responds.

Thus, for example, when the output of flip-flop $FF_2$ appearing at terminal y of STAGE 2 in FIG. 5a is logical 1 (which by reason of $INV_5$, occurs at the termination of a tone detected by receiver detector $R/D_2$), the switch in STAGE 3 corresponding to switch $SW_2$ in STAGE 2 will be closed by such logical 1 output when it appears on line 93-3 at terminal x of STAGE 3. A proper tone appearing on line 95-3 at terminal u of STAGE 3 will, when it terminates, cause to be set the flip-flop in STAGE 3 corresponding to flip-flop $FF_2$ in STAGE 2. The output of STAGE 3 at terminal y will then be logical 1 and the next stage, if any, will then be conditioned to detect the next proper tone of the sequence. Of course, if four tones are to be detected, then four stages (N=4) are required.

The output at terminal y of the last stage, STAGE N, provides the set command on line 98 to flip-flop $FF_3$. As can be inferred from FIG. 5a, the reset inputs of the flip-flops in STAGES 2 to N are connected by a common line 104, thus, the flip-flop of all stages are reset simultaneously by a logical 0 to logical 1 transition on line 103. One shot multivibrator $O/S_1$ (not shown in FIG. 5a) must of course have a pulse width sufficiently broad to ensure that complete sequences of tones can be detected.

Thus, for example, and assuming that the tones identifying the front horizontal track preceed the tones identifying the vertical transmission track, then, the required sequence of tones to open vertical transmission gate $GV_{1,1,3}$, would be 4,600 HZ - 5,400 HZ - 4,000 HZ - 4,200 HZ (digit sequence 3-7-0-1). To close the gate would require the same sequence followed by a 6,000 HZ DISCONNECT tone.

Figure 7:
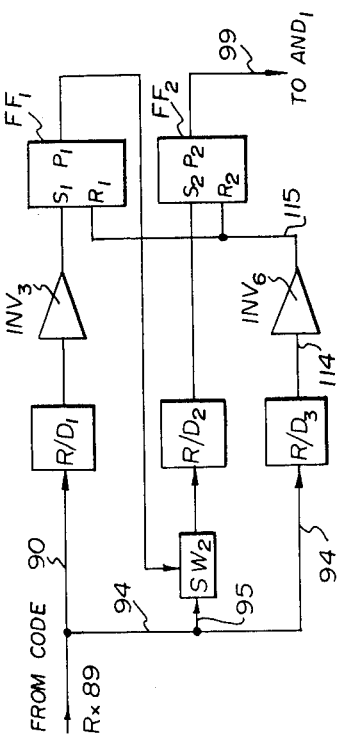
FIG. 7 is a portion of a circuit diagram of a simplified transmission gate.

FIG. 7 illustrates a more basic transmission gate circuit which does not incorporate a timing circuit and does not require a DISCONNECT tone to be first preceded by the two-tone sequence required to open the gate. Only a portion of the circuit has been shown but it may be thought of as replacing all circuitry in FIG. 5 between the output of code receiver 89 and the line 99 input to gate $AND_1$ in FIG. 5. As can be seen, what is shown in FIG. 7 includes many of the same elements as shown in FIG. 5 interconnected in a very similar manner as in FIG. 5, but excludes many other elements. One additional element, inverter $INV_6$ is included.

The sequential operation of flip-flops $FF_1$ and $FF_2$ in FIG. 7 to cause a logical 1 condition to appear on line 99 at the output $P_2$ of flip-flop $FF_2$ is identical to the sequential operation of flip-flops $FF_1$ and $FF_2$ in FIG. 5 to cause a logical 1 condition to appear on line 98 in FIG. 5. However, flip-flops $FF_1$ and $FF_2$ in FIG. 7 are not automatically reset within a predetermined time after the proper first digit tone is detected by receiver-detector $R/D_1$ in FIG. 7. Instead, they are reset directly by receiver detector $R/D_3$ when it receives at its input on line 94 a disconnect tone and in response produces at its output on line 114 a logical 1 condition which is the input to inverter $INV_5$. The output of $INV_5$ on line 115 then goes to logical 0. When the disconnect tone terminates the output of $INV_5$ on line 115 returns to logical 1. The transition from logical 0 to logical 1 on line 115 appears as a reset command to reset inputs $R_1$, $R_2$ of flip-flops $FF_1$, $FF_2$ respectively. Since a switch does not appear before the input of receiver detector $R/D_3$, contrary to the case in the circuit of FIG. 5, a reset command will result whenever a disconnect tone appears on line 90 at the output of code receiver 89. The reason that the circuit is designed to reset flip-flop $FF_2$ at the termination of a disconnect tone rather than the beginning is that the disconnect tone will ordinarily cause closure of two transmisison gates — one vertical transmission gate and one horizontal transmission gate — it being superimposed on both a 1 MHZ and 2 MHZ carrier. If the external sources are controlled such that the carriers only enter on the incoming line (they could enter from an outgoing line after a communication link was established) and assuming that the disconnect tone is simultaneously imposed on both the 1 MHZ carrier and the 2 MHZ carrier, then the possibility exists that the vertical gate will close before the horizontal gate can respond if the vertical gate closes at the beginning of the disconnect tone.

A variety of circuit structures to effect the opening and closing of gates by use control signal inputs from the transmission path are possible and will occur to those skilled in the art. As will be seen, a particular structure may possess characteristics which impose practical limitations on the use to which the path routing arrangement in which the circuits are used is put depending on line or terminal equipment in association with which the path routing arrangement is used. Likewise, the transmission gates could be designed to respond to code signals other than the particular code signals selected. In the circuits represented by FIGS. 5 and 7, two audio tones in proper sequence are required to identify the transmission gate. Theoretically one tone could be used to identify a particular transmission gate, but in a path routing arrangement where 100 transmission gates appear on a transmission track, 100 separate tones would have to be used if only one carrier frequency was used to carry code tones for transmission gates on that track. However, it would be possible to use different carrier frequencies for different groups of gates on the same transmission track and at the same time use 10 or some other number of superimposed tones on those carrier frequencies. For example, for a transmission track providing control signals to 100 transmission gates, one of 20 tones on one of five carriers would be sufficient to uniquely identify each transmission gate on the particular track. Of course, this would not uniquely identify a gate on a platform having 100 tracks. In theory, it would be possible to use unmodulated carriers coded by selection of carrier frequency. For example, 1.0 MHZ might represent the digit 0, 1.1 MHZ the digit 1, 1.2 MHZ the digit 2, and so on.

All the foregoing is predicated by the comment made earlier that the control signals for transmission gates need not be carried by the transmission tracks. For example, switch $SW_1$ in FIG. 5 could be controlled by purely digital means responsive to serial or parallel logic control signals (or a combination of serial and parallel logic control signals, which means would receive its logic inputs from circuit lines other than the transmission tracks. The techniques to open a switch by a circuit that is selectively responsive to one of mamy possible digital logic input combinations appearing on one (ie. completely serial logic) or more input lines are well known and need not be discussed in any detail. The logic signal inputs may, for example be binary, or binary coded decimal or some other digital code. If the particular logic signal inputs happen to be the matching combination for which the transmission gate circuit is coded, then the gate closes.

The use of transmission gates having the circuit structures shown in FIGS. 5 and 7 will now be described with reference to path routing arrangement 1 of FIG. 1.

Where the path routing arrangement 1 incorporates transmission gates such as that shown in FIG. 7, it is preferable to ensure that once a bi-directional link is established between any given ingoing line and any given outcoming line that no signal from any other incoming line be allowed access to any transmission track of the bi-directional link. The reason is that unless some means external to the path routing arrangement is used to prevent a DISCONNECT tone from entering on a second, third, etc. incoming line, the link may be prematurely terminated. A 6,000 HZ tone will cause closure of any gate, the code receiver of which is tuned to the 1 MHZ or 2 MHZ carrier, as the case may be. If some such external means is included, then the subsequent incoming line from which access was gained will continue to have access after it would otherwise have provided a DISCONNECT tone and until a DISCONNECT tone is forthcoming from another source.

To deny access to signals from incoming lines other than the incoming line which forms part of the link, requires the disabling of all vertical transmission gates which connect to the front horizontal track of the link, and of all horizontal transmission gates which connect to the cross horizontal track of the link (other than the one vertical transmission gate and one horizontal transmission gate that are part of the link).

Assume, for example, that in FIG. 1 a communication link has been established between incoming line $I_{0101}$ and outgoing line $\phi_{9997}$. Then, vertical transmission gate $GV_{1,1,99}$ and horizontal transmission gate $GH_{1,99,97}$ are open. The gates which are to be disabled are horizontal transmission gates $GH_{p,99,97}$ ($p = 0,2,3, \ldots 99$) and vertical transmission gates $GV_{1,q,99}$ ($q = 0, 2, 3, \ldots 99$). If the transmission gate structure shown in FIG. 7 is used for the vertical and horizontal transmission gates, and assuming the BUSY CIRCUIT 110 of FIG. 5 is incorporated, then the desired disabling function is achieved if BUSY LINE 109 of each horizontal gate $GH_{p,99,97}$ ($p = 0,99$) is connected to the BUSY LINE 109 of every other horizontal gate $GH_{p,99,97}$ ($p = 0,99$) and if the BUSY LINE 109 of each vertical gate $GV_{1,q,99}$ ($q = 0,99$) is connected to the BUSY LINE 109 of every other vertical gate $GV_{1,q,99}$ ($q = 0,99$). When transmission gates of path routing arrangement 1 are disabled in the manner just described, it becomes evident that when a transmission path is established and in use only two of the assumed 20 possible communication channels may be occupied in the transmission path (see Table A). As will become apparent, this is a somewhat inefficient use of the path routing arrangement.

It will be appreciated that a significant amount of potential blockage is present in the embodiment just considered. For the particular example, no other incoming line to vertical platform $VP_1$ of FIG. 1 can gain access to any outgoing line of horizontal platform $HP_{99}$, including outgoing line $\phi_{9997}$ which was the outgoing line in use. The reason is that incoming lines to vertical platform $VP_1$ can only gain access to horizontal platform $HP_{99}$ by way of front horizontal transmission track $F_{1,99}$ through vertical gates $GV_{1,q,99}$ ($q = 0,99$).

If transmission gates such as the transmission gate shown in FIG. 5 are used for horizontal transmission gates; and, transmission gates such as the transmission gate shown in FIG. 5a having four STAGES (i.e. N=4) are used for vertical transmission gates, then, the amount of blockage can be reduced.

It is implicit that reduction in blockage requires that any given front horizontal transmission path may form part of more than one bi-directional communication link at one time. Hence the task is now to ensure that the same channel is not occupied in more than one bi-directional link. This requires knowledge of the channels that will be occupied during any given bi-directional link. There are various ways in which the channels that will be occupied can be predetermined depending on the characteristics of equipment external to the path routing arrangement connecting to the incoming and outgoing lines.

One way to assign channels is to require that a communication signal from a given incoming line to any desired outgoing line always be in a channel determined by the identification of the incoming line and that a communication signal back from the deisired outgoing line to the given incoming line always be in a channel determined by the identification of the outgoing line. Alternately channels may be assigned by requiring that the communication signals from a given line to any desired outgoing line and from the desired outgoing line to the given incoming line be in separate channels both of which are determined by the identification of the incoming line.

In the following discussion, it is assumed that the channel for a communication carrier from an incoming line is assigned depending on the last digit of the number identifying the incoming line. Thus, for example, communication signals from incoming line $I_{0101}$ to path routing arrangement 1 of FIG. 1 are conditioned in advance to occupy channel 1 LOW — the carrier frequency being 100 MHZ (see Table A). Likewise, for example, communication signals from outgoing line $\phi_{9997}$ to path routing arrangement 1 are conditioned in advance to occupy channel 7 HIGH — the carrier frequency being 260 MHZ (see Table A). If a bidirectional link is established between line $I_{0101}$ and line $\phi_{9997}$, channel 1 LOW and channel 7 HIGH are occupied on front horizontal transmission track $F_{1,99}$. Hence it is necessary to deny access to track $F_{1,99}$ from any other incoming line from which signals occupying channel 1 LOW would arrive. On vertical platform $VP_1$, signals arriving from incoming lines $I_{01x1}$ ($x = 0,9$) would occupy channel 1 LOW, thus, for example, it is necessary to deny access to incoming lines $I_{01x1}$ ($x = 0,2,3, \ldots ,9$). Using the transmission gate of FIG. 5, this result is achieved if the BUSY LINE 109 of each vertical transmission gate $GV_{1,x1,99}$ ($x = 0,9$) is connected to the BUSY LINE 109 of every other vertical transmission gate $GV_{1,x1,99}$ ($x = 0,9$).

Likewise, it is necessary to deny access to track $F_{1,99}$ from any outgoing line other than line $\phi_{9997}$ from which signals occupying channel 7 HIGH would arrive. On horizontal platform $HP_{99}$, signals arriving from outgoing line $\phi_{99y7}$ ($y = 0,9$) would occupy channel 7 HIGH thus, for this example, it is necessary to deny access to outgoing lines $\phi_{99y7}$ ($y = 0,8$). Using the transmission gate of FIG. 5a, this result is achieved if the BUSY LINE 109 (not shown in FIG. 5a, of each horizontal transmission gate $GH_{1,99,y7}$ ($y = 0-9$) is connected to the BUSY LINE 109 of every other horizontal transmission gate $GH_{1,99,y7}$ ($y = 0,9$). At the same time all access to outgoing line $\phi_{9997}$ through front horizontal transmission tracks other than front horizontal transmission track $F_{1,99}$ is denied by the connection of the BUSY LINE 109 of each horizontal transmission gate $GH_{p,99,97}$ ($p = 0,99$) to the BUSY LINE 109 of every other horizontal transmission gate $GH_{p,99,97}$ ($p = 0,99$).

Of course, the same BUSY LINE connections are made, mutatis mutandis, throughout path routing arrangement 1.

If all vertical transmission gates were merely identified by two tones, then, on a control signal sequence to close a given vertical transmission gate on a given front horizontal transmission track, all other open vertical transmission gates on the same front horizontal transmission track would close since such other vertical transmission gates are coded for the same two tones. Too avoid such undesirable response, it is necessary to code the vertical transmission gates on a given front horizontal transmission track not only in respect of the front horizontal transmission track with which they are associated, but also in respect of the incoming line from which the control signals are received. As has been said, on a given vertical platform, a vertical transmission gate is completely identified if it is identified by the last two digits of the number which identifies the incoming line from which the gate receives control signals and by the last two digits of the number which identifies the front horizontal track to which the gate connects (a leaing 0 being added to this last number if necessary — for example, for frnt horizontal transmission track $F_{21,8}$ (not shown in FIG. 1), the last two digits are to be taken as 08 and not 18).

The operation of path routing arrangement 1 of FIG. 1 using transmission gates as shown in FIG. 4 for horizontal transmission gates and transmission gates as shown in FIGS. 5a for vertical transmission gates will now be considered by way of example. Firstly, the establishment of a bi-directional link between incoming line $I_{0101}$ and outgoing line $\phi_{9997}$ will be considered.

To give itself access to front horizontal transmission track $F_{1,99}$, incoming line $I_{0101}$ must provide within the proper time interval the control signal sequence 5,800 HZ - 5,800 HZ - 4,000 HZ - 4,200 HZ (digit sequence 9-9-0-1) on a 1 MHZ carrier. If vertical transmission gate $GV_{1,1,99}$ is not disabled by a busy signal on its BUSY LINE 109, then gate $GV_{1,1,99}$ will open in response to such sequence. Control signals from incoming line $I_{0101}$ may now travel down front horizontal transmission track $F_{1,99}$.

To give access to cross horizontal transmission track $C_{99,97}$ from track $F_{1,99}$, incoming line $I_{0101}$ must now provide within the proper time interval the control signal sequence 5,800 HZ - 5,400 HZ (representing the digit sequence 9-7) on a 2 MHZ carrier. If horizontal transmission gate $GH_{1,99,97}$ is not disabled by a busy signal or its BUSY LINE 109, then gate $GH_{1,99,97}$ will open in response to the sequence. Access would then be gained to cross horizontal transmission track $C_{99,97}$ and necessarily to outgoing line $\phi_{9997}$ through slot $S_{99,97}$ and back horizontal transmission rack $B_{99,97}$. Outgoing line $\phi_{9997}$ would have access to incoming line $I_{0101}$ in the opposite direction over the now established path.

If horizontal transmission gate $GH_{1,99,97}$ has been disabled by a busy signal of its BUSY LINE 109, the access gained to front horizontal transmission track may be terminated if line $I_{0101}$ provides within the proper time interval the control signal sequence 5,800 HZ - 5,800 HZ - 4,000 HZ - 4,200 HZ - 6,000 HZ (representing the digit sequence 9-9-0-1 followed by the DISCONNECT tone) on a 1 MHZ carrier. The non-establishment of such access might be determined by external equipment (not shown in FIG. 1) associated with incoming line $I_{0101}$ by the non-receipt of a signal from line $\phi_{9997}$ indicating that access had been established. The non-establishment of access to front horizontal transmission track $F_{1,99}$ could be determined in a similar manner.

If a complete bi-directional link between lines $I_{0101}$ and $\phi_{9997}$ is established, it may be terminated by proper control signals within the proper time interval from either the incoming line or the outgoing line or both. If the control signals are to be provided from incoming line $I_{0101}$ the complete sequence 5,800 HZ - 5,400 HZ - 6,000 HZ (9-7-DISCONNECT) on a 2 MHZ carrier to close horizontal gate $GH_{1,99,97}$; then 5,800 HZ - 5,800 HZ - 4,000 HZ - 4,200 HZ - 6,000 HZ (9-9-0-1-DISCONNECT) on a 1 MHZ carrier to close vertical gate $GV_{1,1,99}$. The vertical gate must not be closed before the horizontal gate. If the control signals are to be provided from outgoing line $\phi_{9997}$ the complete sequence is 5,800 HZ - 5,800 HZ - 4,200 HZ - 6,000 HZ (9-9-0-1-DISCONNECT) on a 1 MHZ carrier to close vertical gate $GV_{1,1,99}$, then 5,800 HZ - 5,400 HZ - 6,000 HZ - (9-7-DISCONNECT) on a 2 MHZ carrier to close horizontal gate $GH_{1,99,97}$. In this instance, the horizontal gate must not be closed before the vertical gate. If the control signals are provided from both lines, then of course the sequence of gate closure is not crucial.

It will now be assumed that a bi-directional link between incoming line $I_{0101}$ and outgoing line $\phi_{9997}$ has been established. Channel 1 LOW from line $I_{0101}$ to line $\phi_{9997}$ is occupied and channel 7 HIGH from line $\phi_{9997}$ to line $I_{0101}$ is occupied. No incoming line to vertical platform $VP_1$ in FIG. 1 having as a last digit identification the number 1 can gain access to horizontal transmission track $F_{1,99}$. Likewise, no incoming to vertical platform $VP_1$ that has a last digit identification, a number other than "L" which does gain access to track $F_{1,99}$ can gain access to any cross horizontal transmission track having as a last digit identification the number 7 (except, as will be discussed track $C_{99,97}$ associated with outgoing line $\phi_{9997}$). Front horizontal transmission track $F_{1,99}$ can still be used in a bi-directional link between an incoming line having a last digit identification other than 1 and an outgoing line having a last digit identification other than 7. If a second bi-directional link is established subject to those conditions, then, similar conditions apply for a third link, a fourth link, and up to 10 links for the 20 channels assumed. If 10 links are formed than the last digit identification of each of the 10 incoming lines will differ from each other, and the last digit identification of each of the ten outgoing lines will differ from each other. For example, front horizontal transmission track $F_{1,99}$ might form part of the bi-directional link between the following pairs of lines at the same time:

TABLE C

| | LINE PAIRS | CHANNELS OCCUPIED |
|---|---|---|
| (1) | $I_{0101} - \phi_{9997}$ | 1 LOW - 7 HIGH |
| (2) | $I_{0122} - \phi_{9968}$ | 2 LOW - 8 HIGH |
| (3) | $I_{0173} - \phi_{9939}$ | 3 LOW - 9 HIGH |
| (4) | $I_{0104} - \phi_{9940}$ | 4 LOW - 0 HIGH |
| (5) | $I_{0185} - \phi_{9951}$ | 5 LOW - 1 HIGH |
| (6) | $I_{0166} - \phi_{9982}$ | 6 LOW - 2 HIGH |
| (7) | $I_{0147} - \phi_{9903}$ | 7 LOW - 3 HIGH |
| (8) | $I_{0198} - \phi_{9914}$ | 8 LOW - 4 HIGH |
| (9) | $I_{0139} - \phi_{9935}$ | 9 LOW - 5 HIGH |
| (10) | $I_{0150} - \phi_{9956}$ | 0 LOW - 6 HIGH |

It will be appreciated that the concurrent presence of moe than one bi-directional link through a given front horizontal transmission track will mean that an incoming line or an outgoing line will necessarily receive from the path routing arrangement all channels from the other incoming and outgoing lines which lines connect through the same front horizontal transmission track. For example, referring to TABLE C, incoming line $I_{0101}$ would not only receive channel 7 HIGH from outgoing line $\phi_{9997}$ but also would receive channels 0 to 6 and 8 HIGH from the other outgoing lines and would receive channels 0, and 2-9 LOW from the other incoming lines because paths would be defined from one incoming line to others. For example, the path between incoming line $I_{0122}$ (see TABLE C) and incoming line $I_{0101}$ would be defined by vertical transmission track $V_{1,22}$ (not shown); the portion of front horizontal transmission track $F_{1,99}$ between vertical gate $GV_{1,22,99}$ (not shown) and vertical gate $GV_{1,1,99}$; and vertical transmission track $V_{1,1}$. It is contemplated that the external equipment (not shown) that may receive multiple channels from incoming and outgoing lines will include means to discriminate signals on a particular channel and heavily attenuate signals on other channels which it does not desire to receive.

There is a situation which has not been considered and that is where, for example, there is a bi-directional link between incoming line $I_{0101}$ and outgoing line $\phi_{9997}$ and an attempt is made to establish a bi-directional link between some other incoming line and outgoing line $\phi_{9997}$ using front horizontal transmission track $F_{1,99}$. Say, for example that the attempted link was between incoming line $I_{0125}$ (not shown) and outgoing line $\phi_{9997}$. Incoming line $I_{0125}$ would first provide the control signal sequence 5,800 HZ - 5,800 HZ - 4,400 HZ - 5,000 HZ (digit sequence 9-9-2-5) on a 1 MHZ carrier thereby giving access to track $F_{1,99}$ through vertical transmission track $V_{1,25}$ and vertical transmission gate $GV_{1,25,99}$, and would then provide the digit sequence 5,800 HZ - 5,400 Hz (digit sequence 9-7) on a 2 MHZ carrier, prospectively to open horizontal gate $GH_{1,99,97}$. However, horizontal gate $GH_{1,99,97}$ would already be open. It would not close in the absence of the required 6,000 HZ DISCONNECT tone. However, a transmission path would exist between incoming line $I_{0125}$ and outgoing line $\phi_{9997}$.

If the external equipment (not shown) to which line $\phi_{9997}$ is connected is conditioned to receive channel 1 LOW from line $I_{0101}$, attempted communications on channel 5 LOW from line $I_{0125}$ would be heavily attenuated and would not interfere. However, the external equipment (not shown) to which line $I_{0125}$ is connected would presumably be conditioned to receive channel 7 HIGH from line $\phi_{9997}$ and would accordingly receive communication intended to be directed only to line $I_{0101}$.

Thus, it is preferable that the external equipment (not shown) associated with line $\phi_{9997}$ include means to detect the instance of access by line $I_{0125}$ and to send a signal back through the path routing arrangement to disable reception by the external equipment (not shown) associated with line $I_{0125}$ of channel 7 HIGH.

This characteristic may be avoided by assigning channels in complete dependency on the last digit of the identifying number of the line. For example, channel numbers from an incoming line to path routing arrangement 1 as set forth in TABLE A may be fixed as indicated, but channel numbers from an outgoing line to path routing arrangement 1 would be variable depending on the channel number of the incoming line and not fixed depending on the last digit of the number identifying the outgoing line. Thus, for example, incoming lines having as a last digit identifying the line the number N (i.e. $I_{WXYN}$) would provide communication signals to the path routing arrangement 1 on channel N LOW (N=0,1, ..., 9) and would always receive communication signals from the path routing arrangement on channel N HIGH (N=0,1, ..., 9). Necessarily, outgoing lines would then receive communications from the path routing arrangement on any of the LOW channels but would provide communications to the path routing arrangement on any of the 10 HIGH channels in dependency on the incoming line with which it is linked. An advantageous consequence of this method of assignment is that it is no longer necessary to connect the BUSY LINES of every 10th horizontal transmission gate on the same front horizontal transmission track as was done with the previous method channel assignment. If the BUSY LINES of every 10th vertical transmission gate are connected (for example, the BUSY LINES of vertical gates $GV_{1,1,99}$, $GV_{1,11,99}$, $GV_{1,21,99}$, ..., $GV_{1,91,99}$), then it is assured that no other incoming line that would dictate occupation of the same two channels will gain access to the same front horizontal transmission track once access is gained by one such line. For example, if a bi-directional link was established between incoming line $I_{0101}$ and outgoing line $\phi_{9997}$ in FIG. 1 communications signals from line $I_{0101}$ to line $\phi_{9997}$ would be on channel 1 LOW. Communications signals in the opposite direction would be on channel 1 HIGH. Incoming lines $I_{0111}$, $I_{0121}$, $I_{0131}$, ..., $I_{0191}$ (not shown) would be denied access to front horizontal transmission track $F_{1,99}$. Any other incoming line on vertical platform $VP_1$ would have access to track $F_{1,99}$ and would have further access to any cross horizontal track connecting to track $F_{1,99}$ through a horizontal gate. Such further access would depend only on whether the horizontal gate was disabled by a busy signal from another gate on the same cross horizontal transmission track — the BUSY LINES of horizontal transmission gates in this respect being connected in the same manner as for the previous method of channel assignment.

If it now occurred, for example, that there was an attempted link between incoming line $I_{0125}$ (not shown) and outgoing line $\phi_{9997}$ when a link between incoming line $I_{0101}$ and outgoing line $\phi_{9997}$ was already established, then the communication from line $\phi_{9997}$ intended to be directed only to line $I_{0101}$ would not be received on the channel (channel 5 HIGH) which the external equipment (not shown) connected to line $I_{0125}$ would be conditioned to receive.

However, as was discussed with respect to the previous method of channel assignment, it is still preferable that the external equipment (not shown) associated with each outgoing line such as line $\phi_{9997}$ include means to detect the instance of access by a second incoming line such as line $I_{0125}$ (not shown) and to send back a signal to which the external equipment (not shown) of line $I_{0125}$ is responsive. The reason is to condition the external equipment associated with line $I_{0125}$ and prevent the generation by such equipment of the control signal sequence 5800 Hz - 5400 HZ - 6000 HZ - (9-7-DISCONNECT) on a 2MHZ carrier thereby causing horizontal transmission gate $Gh_{1,99,97}$ to close and break the link between line $I_{0101}$ and line $\phi_{9997}$. Preferably such conditioning signal would not prevent the generation of the control signal sequence 5,800 Hz - 5800 HZ - 4400 HZ - 5000 HZ - 6000 HZ (9-9-2-5-DISCONNECT) required to close vertical transmission gate $GV_{1,25,99}$.

The use of path routing arrangement 1 in a communication system will be now described with reference to FIG. 8 which is a symbolic diagram illustrating certain basic aspects of a communications system that interconnects a plurality of audio/video subscriber terminals T ($T_0, T_1, \ldots, T_{9999}$) through an exchange 1 to enable bi-directional audio/video communications links to be established between calling ones and called ones of the subscriber terminals. Only two subscriber terminals $T_j$ (PARTY A) and $T_k$ (PARTY B), and portions of the system associated immediately therewith are shown.

For purposes of illustration it will be assumed in particular instances that PARTY A is identified by the number "4828" and that PARTY B is identified by the number "8764".

With each subscriber terminal T ($T_0, T_1 1 \ldots, T_{9999}$) there is associated line equipment E ($E_0, E_1, \ldots, E_{9999}$) located within the exchange 1. Only line equipment $E_j$ and $E_k$ is shown. Terminal lines L ($L_0, L_1 \ldots, L_{9999}$) which may, for example, be coaxial cable provide a bi-directional transmission path between the subscriber terminals T and their respective line equipment E — only lines $L_j$ and $L_k$ being shown.

In general, it is contemplated that subscriber terminals T may be remote from exchange 1 and accordingly a portion of each terminal line L is common with nine other such portions. Thus, in FIG. 8, portion $L_{jp}$ of line $L_j$ (i.e. the portion of line $L_j$ between points 22 and 23 of line $L_j$) may be thought of as common with terminal line portions $T_{(J+1)p}, \ldots T_{(J+9)}$. Similarly, portion $L_{kp}$ of line $L_k$ may be thought of as common with portion $L_{(k+1)p}, \ldots, L(k_+9)p$; it being understood that the j-series of lines does not overlap with the k-series of lines. Ten subscriber terminals T share the line portions because it is assumed, as with communications signals through the path routing arrangement, that up to 20 communication channels may occupy a terminal line. In particular, it will be assumed that each subscriber terminal, depending on the last digit of its terminal number, transmits on a LOW channel in accordance with TABLE A and receives on a corresponding HIGH channel in accordance with TABLE A. (For this purpose reference to "from an incoming line" or "from an outgoing line" as appears in Table A should be ignored). Thus, for example, PARTY A in FIG. 8 (number 4828) transmits on channel 8 LOW (142 MHZ) and receives on channel 8 HIGH (242 MHZ). Likewise, PARTY B (number 8764) transmits on channel 4 LOW (118 MHZ and receives on channel 8 HIGH (218 MHZ).

Figure 8:
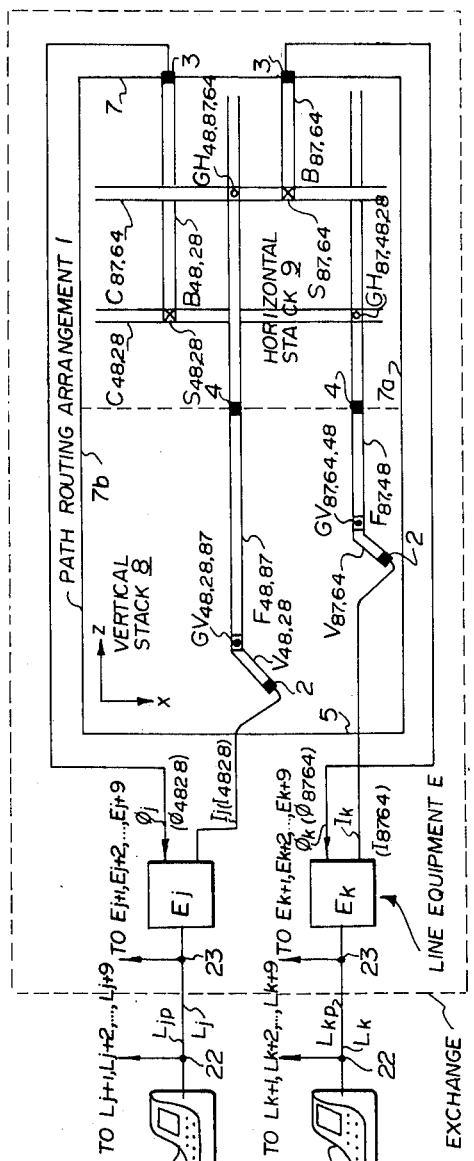
FIG. 8 illustrates a portion of a system incorporating the path routing arrangement of FIG. 1 and interconnecting a plurality of audio/video subscriber terminals.

The line equipment E of each subscriber terminal T is connected by two bi-directional transmission paths (for example, coaxial lines) to the path routing arrangement 1 of FIG. 8. As shown by the example of line equipment $E_j$ amd $E_k$, one such path is an incoming line $I_j$ or $I_k$, as the case may be; the other such path is an outgoing line $\phi_j$ or $\phi_k$, as the case may be. The connection of incoming and outgoing lines to the path routing arrangement was discussed with reference to FIGS. 2a and 2b. Also, the identification of incoming and outgoing lines was discussed, but as can be seen in FIG. 8 the identification of a given incoming or outgoing line has been arranged to correspond with the identification of the subscriber terminal T with which it is associated.

The line equipment E of any subscriber terminal T has three basic modes of operation: (1) a calling mode of operation where the subscriber terminal with which it is associated is the terminal from which a call is placed; (2) a called mode of operation where the subscriber terminal with which it is associated is the terminal to which a call is placed; and (3) a standby mode of operation in which the subscriber terminal is neither in the called or calling mode of operation. In the calling mode of operation the line equipment $E_j$, for example, provides circuit paths between the terminal line $L_j$ and the incoming line $I_j$ for for communications from the calling subscriber terminal to the called subscriber terminal, and for communications from the called subscriber terminal to the calling subscriber terminal. In the called mode of operation similar circuit paths are provided between the terminal line $L_j$ and the outgoing line $\phi_j$.

The line equipment E also provides control signals to control the operation of the transmission gates in path routing arrangement 1 of FIG. 8. In the description that follows it is assumed that such control signals are provided over the incoming lines associated with calling subscriber terminals rather than over separate circuit lines from the line equipment to the gates. Generally, using by way of example the particular subscriber terminals shown in FIG. 8, the line equipment operates as follows: On a call from PARTY A to PARTY B, the line equipment $E_j$ of PARTY A, starting from its standby mode of operation is first "seized" by an appropriate command from subscriber terminal $T_j$ which seizure switches line equipment $E_j$ to the calling mode of operation. The line equipment $E_j$ is then conditioned to receive further commands from the subscriber terminal $T_j$ and in response thereto to provide selected code signals over incoming line $I_j$ to open the desired gates in the path routing arrangement. On a call from PARTY A to PARTY B, and assuming access can be gained to all necessary transmission tracks (i.e. no BUSY SIGNALS), such control signals are coded to open vertical transmission gate $GV_{48,28,87}$ and horizontal transmission gate $GH_{48,87,64}$ thereby defining a transmission path including these gates through path routing arrangement 1 between incoming line $I_j$ and outgoing line $\phi_k$. If the call had been from PARTY B to PARTY A, then gates $GV_{87,64,48}$ and $GH_{87,47,28}$ would have been opened and the defined transmission path would have been between incoming line $I_k$ and outgoing line $\phi_j$.

Referring to path routing arrangement 1 as shown in FIG. 8, it will be appreciated that with the exception of vertical transmission tracks $V_{48,28}$ and $V_{87,64}$, the structure appearing within the arrangement roughly approximates the geometric locations of the two possible paths between PARTY A and PARTY B in the three dimensional structure of FIG. 1. The x-z axes in FIG. 8 correspond to the x-z axes shown in FIG. 1. For example, in FIG. 8 front horizontal transmission track $F_{48,87}$ is approximately where it should be (although its width is greatly exaggerated) considering that it is on the 49th vertical platform (not shown) of 100 vertical platforms (not shown) stacked in vertical stack 8 between side walls 7b and 7a — the first such platform being adjacent side wall 7b.

Of course, the particular design of line equipment will depend upon a number of factors including: the character of control signals the line equipment receives from the subscriber terminal; the character of control signals the line equipment must provide to operate the transmission gates of the path routing arrangement and the means whereby such control signals are transmitted to the transmission gates (i.e. as an input to the path routing arrangement from incoming lines, or, as an input to the path routing arrangement on control signal lines separate from the incoming lines); the conditioning action that the line equipment is received to perform on communications signals to maintain proper frequency division of channels; and, the character of control signals the line equipment receives from or sends to other line equipment.

Figure 8A:
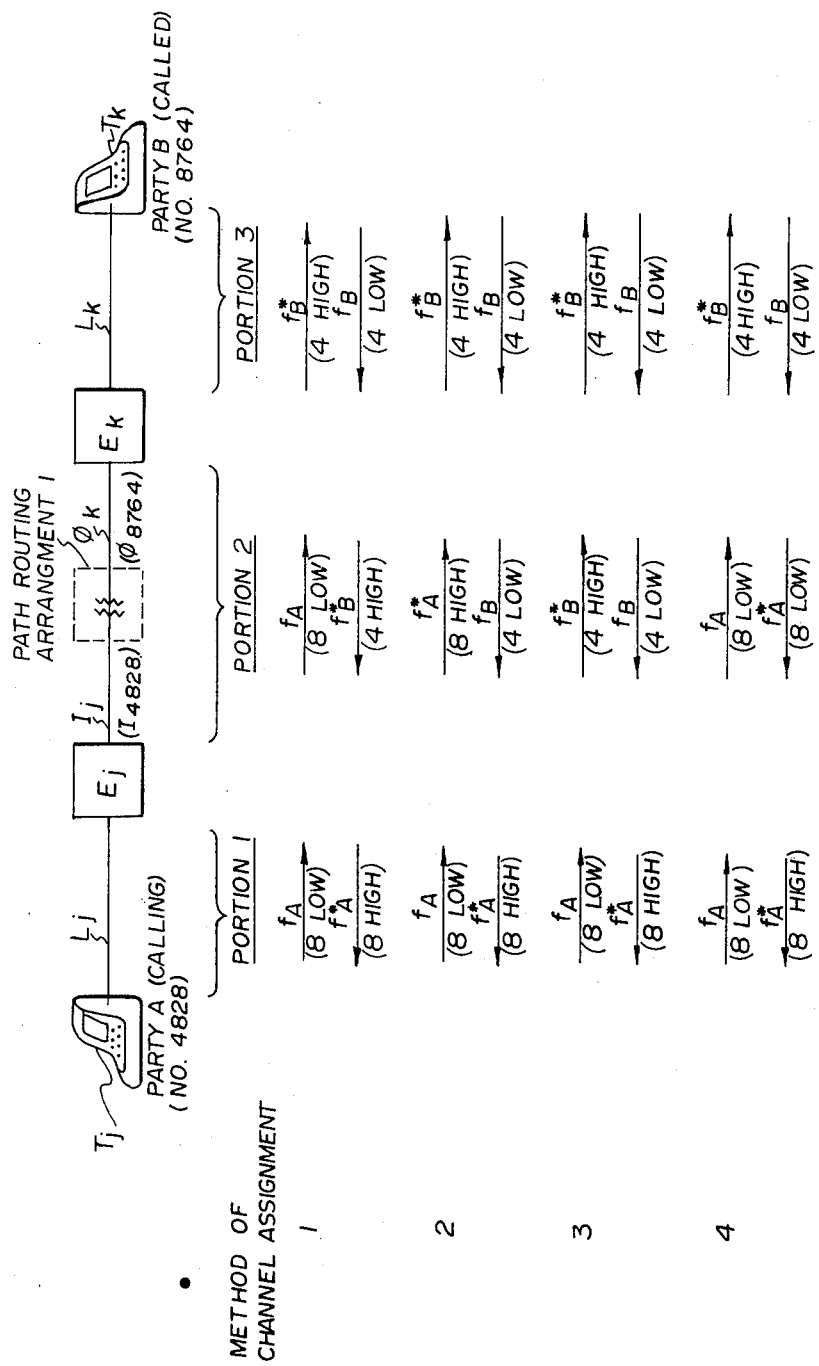
FIG. 8a illustrates a variety of possible carrier frequency assignments along various portions of a bi-directional transmission path between a calling subscriber terminal and a called subscriber terminal.

With regard to the maintenance of proper frequency division, it will be appreciated that, depending on channel assignments through the path routing arrangement, and depending on the receiving and transmitting channels of the subscriber terminal, the line equipment of a particular subscriber terminal may be required to translate the carrier frequency of communications signals it receives from the subscriber terminal, or from its associated incoming or outgoing line. FIG. 8a shows a number of possible channel assignments that maintain a division of frequency along various portions of the transmission path between PARTY A and PARTY B when PARTY A is the calling party. Path routing arrangement 1 is shown superficially in FIG. 8a because it is assumed that the communications link therethrough is established.

In FIG. 8a, carrier frequencies along various portions in a given direction of transmission (as indicated by the arrows) are indicated generally by $f_A$, $f_A{}^*$, $f_B$ and $f_B{}^*$ for each of four methods of channel assignment. The particular channels that would be occupied along each portion of PARTY A and PARTY B were identified by the numbers 4828 and 8764, respectively, is indicated in brackets beneath the generally indicated carrier frequencies. As can be seen, irrespective of the method of channel assignment, PARTY A always transmits on the carrier frequency $f_A$ (8 LOW) and receives on the carrier frequency $f_A{}^*$ (8 HIGH), and, PARTY B always transmits on the carrier frequency $f_B$ (4 LOW) and receives on the carrier frequency $f_B{}^*$ (4 HIGH). Also, it can be seen that irrespective of the method of channel assigment, a division of frequency is maintained over the path through the path routing arrangement 1 included in portion 2.

The first and fourth methods of channel assigment shown in FIG. 8a have been previously discussed in the limited context of path routing arrangement 1 per se.

As indicated by the first method, the channel which is occupied for transmission from incoming line $I_j (I_{4828})$ to outgoing line $\phi_k$ ($\phi_{8764}$) is determined by the last digit identifying the incoming line $I_j$ and is a LOW channel (8 LOW); and the channel which is occupied for transmission from outgoing line $\phi_k$ to incoming line $I_j$ is determined by the last digit identifying the outgoing line $\phi_k$ and is a HIGH channel (4 HIGH). According to the first method, it can be seen that line equipment $E_j$ in the calling mode of operation is not required to translate the carrier frequency $f_A$ of signals it receives from lline $L_j$ because the carrier frequency at its output to line $I_j$ is the same. However, line equipment $E_j$ may be required to translate the carrier frequency $f_{B'}{}^*$ of signals received from line $I_j$ because the carrier frequency $f_A{}^*$ at its output to line $L_j$ is not necessarily the same. For the example shown, frequency translation is clearly required to convert channel 4 HIGH to channel 8 HIGH, but would not be required if the number of PARTY B had been, for example, 8768. Also, according to the first method of channel assignment, it can be seen that the line equipment $E_k$ in the called mode of operation is required to translate carrier frequency in both directions of transmission — to convert a LOW channel to a HIGH channel for signals received from line $\phi_k$ and to convert a LOW channel to a HIGH channel for signals received from line $L_k$.

In the fourth method of channel assignment shown in FIG. 8a it can be seen that the channels occupied in path routing arrangement 1 are completely determined by the last digit identifying the incoming line. Consequently, as can be seen, line equipment $E_j$ in the calling mode of operation is not required to translate carrier frequencies in either direction of transmission, but, line equipment $E_k$ in the called mode of operation is required to translate carrier frequencies in both directions of transmission.

The second and third methods of channel assignment shown in FIG. 8a service to indicate that other methods of channel assignment are possible. However, these additional methods certainly do not exhaust the possibilities. Moreover, it might be noted that it is not necessary that the frequency bands occupied by the twenty possible channels that may, in general be carried over a terminal line L (portions 1 and 3 in FIG. 8a do not necessarily have to be the same frequency bands occupied by the 20 possible channels in a defined path through path routing arrangement 1 (portion 2 in FIG. 8a — although there would of course be a correspondence between frequency bands. For example, in method 1 shown in FIG. 8a, the carrier frequencies in portion 2 could theoretically be for example 1.5 $f_A$ and 1.5 $f_B{}^*$, or for example, $f_A$ + 50 MHZ and $f_B{}^*$ + 75 MHZ, rather than $f_A$ and $f_B{}^*$, respectively, as indicated.

For some methods of channel assignment, the system must include means whereby the line equipment of a calling subscriber terminal can condition the line equipment of a called subscriber terminal to transmit to the calling subscriber terminal on a desired carrier frequency. For example, referring to method 4 in FIG. 8a, it can be seen that line equipment $E_k$ receiving channel 4 LOW on line $L_k$ is required to transmit on channel 8 HIGH to line $O_k$. In general, line equipment $E_k$ in the called mode of operation for method 4 may be required to transmit on any of 10 HIGH channels but cannot "know" which HIGH channel absent some identification from the calling party. Where a requirement for such identification arises, it is contemplated that the line equipment of a calling party, in addition to providing control signals to define a path through the path routing arrangement, will also provide a control signal to the line equipment of the called party which latter control signal identifies the calling party. Such identifying control signal may, for example, be an audio tone in accordance with Table B superimposed on, for example, a 3 MHZ carrier signal — such audio tone being a "home tone" representing the channel number (the distinction between HIGH and LOW channels not being a matter for concern) of the calling party. The line equipment of the called party, receiving the home tone on a 3 MHZ carrier would include channel selection means responsive to the home tone to select the carrier frequency on which the line equipment of the called party transmits to its outgoing line. Thus, for example line equipment $E_j$ would transmit a 5600 HZ (Channel 8) home tone on a 3 MHZ carrier to line equipment $E_k$ over the defined path from $E_j$ to $E_k$ causing line equipment $E_k$ to transmit to line $O_k$ on channel 8 HIGH.

The same principles of home tone control may be used to tune a receiver in the line equipment of a called party to receive a desired channel. For example, referring to method 1 or method 4 in FIG. 8a, a 5600 HZ (Channel 8) home tone on a 3 MHZ carrier could be used to tune a receiver in line equipment $E_k$ to receive channel 8 LOW.

Once having decided on the desired performance of a system such as is shown in FIG. 8 and having regard to the characteristics of the transmission gates and the character of control and communication signals from the subscriber terminals, then the design of line equipment to achieve the desired system response will be a routine matter to those skilled in the art. As an illustration of one embodiment for line equipment, a communications system wherein channel assignments are in accordance with the first method of channel assignment shown in FIG. 8a will now be considered with reference to FIGS. 9 to 11. A number of assumptions will be made, and they are as follows:

a. The transmission gates used in the path routing arrangement are of the type shown in FIG. 7. All the BUSY LINES 109 (not shown in FIG. 7 but see discussion relating FIG. 7 to FIG. 5) of vertical transmission gates on a given front horizontal transmission track are connected to each other and all BUSY LINES 109 of horizontal transmission gates on a given cross horizontal transmission track are connected to each other.

b. Carrier frequencies transmitted from a subscriber terminal correspond, as previously discussed, to the last digit identifying the subscriber terminal. The first 6 megahertz of baseband is assigned to carrier video and the 7.5 MHZ baseband frequency for each channel is used as a subcarrier for audio.

c. Audio intelligence (i.e. voice frequency) appears below 4 KHZ audio control signals appear out of band at or above 4 KHZ in accordance with TABLE B. Audio digit tones (0 to 9) are produced by a subscriber terminal in response, for example, to the manual depression of a desired digit button on the subscriber terminal. In addition, a 6000 HZ DISCONNECT tone is produced by a subscriber terminal in response, for example, to hanging up a receiver of the subscriber terminal. Further, a 6200 HZ SEIZURE tone is produced by a subscriber terminal in response, for example, to picking up the receiver of the audio terminal.

d. The line equipment is line equipment $E_j$ for PARTY A (No. 4828) in FIG. 8. The lines $L_j$, $I_j$ and $O_j$ shown in FIG. 9 thus correspond to the lines $L_j$, $I_j$ and $O_j$ shown in FIG. 8.

Accordingly, signals arrive on line $L_j$ on a 170 MHZ carrier (channel 8 LOW), and signals leaving on line $L_j$ leave on a 270 MHZ carrier (channel 8 HIGH). In the calling mode of operation, communications signals leaving on line $I_j$ leave on a 170 MHZ carrier (channel 8 LOW) and communications signals arriving on line $I_j$ arrive on a carrier within the band from 200 MHZ to 300 MHZ (one of the channels 0 to 9 HIGH). In the called mode of operation communications signals arriving on line $O_j$ arrive on a carrier within the band from 100 MHZ to 200 MHZ (one of channels 0 to 9 LOW) and communications signals leaving on line $O_j$ leave on a 270 MHZ carrier (channel 8 HIGH).

Figure 9:
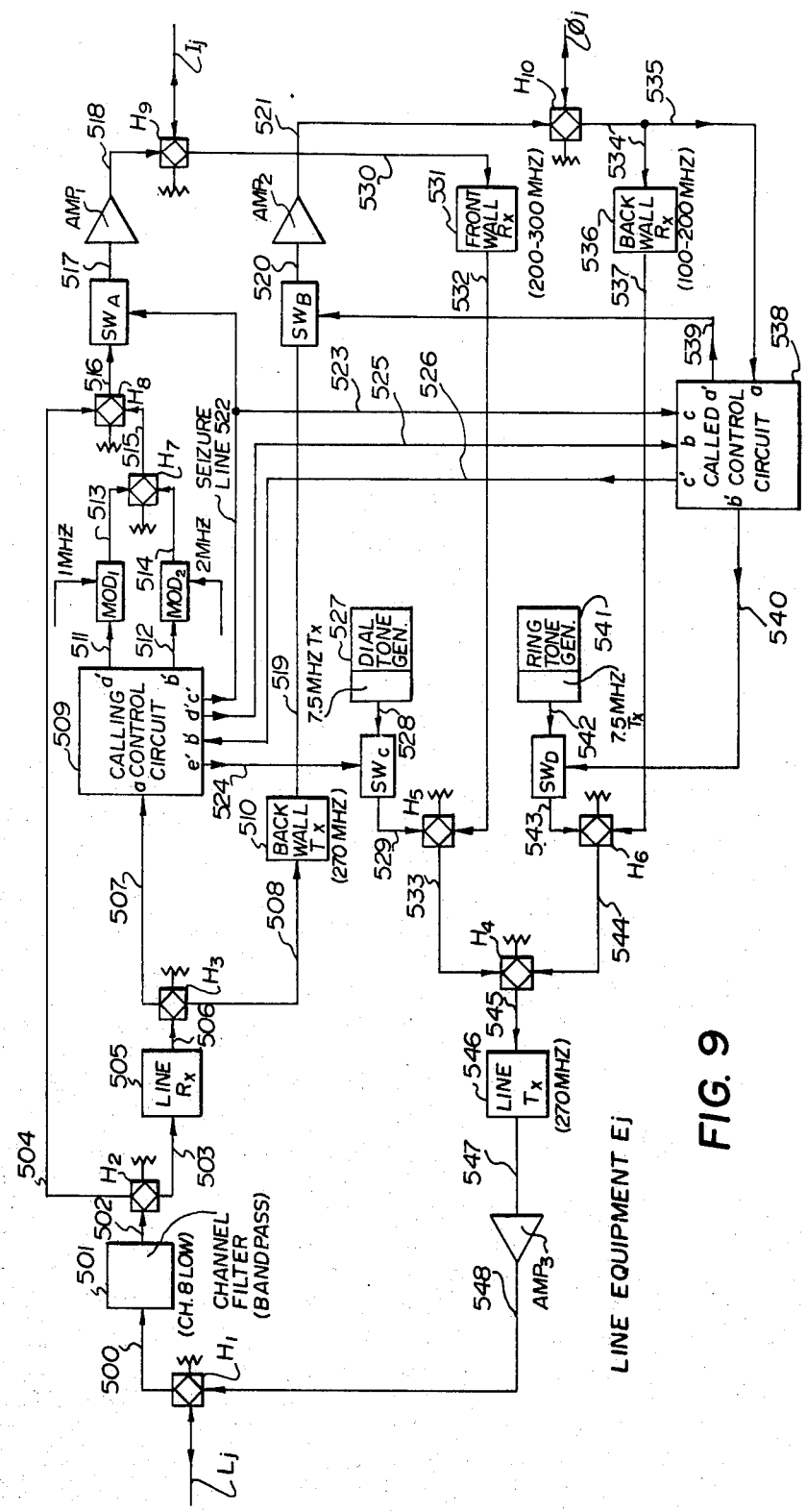
FIG. 9 is a circuit diagram of line equipment associated with a subscriber terminal in the system of FIG. 8.

The operation of line equipment $E_j$ in FIG. 9 will first be considered assuming it is initially in the standby mode of operation, then switches to the calling mode of operation on a call to PARTY B (No. 8764) and then switches back to the standby mode of operation. The operation will then be considered assuming the line equipment is initially in the standby mode of operation, then switches to the called mode of operation, and then switches back to the standby mode of operation. In both cases reference will be made from time to time to FIGS. 10 and 11 which show elements of FIG. 9 in greater detail.

1. Standby-Calling-Standby

Before line equipment $E_j$ can provide control signals to line $I_j$ to open the necessary gates in the path routing arrangement (not shown in FIG. 9) to define a path to PARTY B and subsequently allow PARTY A to communicate with PARTY B, normally open switch $SW_a$ must first be closed. In the standby mode of operation, this switch is open, but closes in response to a logical 1 input on line 522 from output $c'$ of calling control circuit. As will be seen, both control signals and communications signals provided to line $I_j$ from line equipment $E_j$ must pass through switch $SW_a$.

Line equipment $E_j$ will cause closure of switch $SW_a$ if it is in the standby mode of operation and receives at its input from line $L_j$ a 6200 HZ seizure tone on a 7.5 MHZ subcarrier in channel 8 LOW. All signals appearing on line $L_j$ as an input to hybrid $H_1$ appear at the output of hybrid $H_1$ on line 500 to the input of channel filter 501. Channel filter 501 is a bandpass filter which passes only channel 8 LOW and blocks the other 9 LOW channels that may appear on line $L_j$ as a result of the sharing of a portion of line $L_j$ with other subscriber terminals. Likewise, channel filter 501 blocks all 9 HIGH channels which appear on line $L_j$ (ie. excluding 8 HIGH). Assuming hybrid $H_1$ is ideally balanced, channel 8 HIGH would not appear on line 501, but, if there is some unbalance, channel filter 501 blocks the signal.

Signals appearing within channel 8 LOW at the input of channel filter 501 appear at the output thereof on line 502 to the input of hybrid $H_2$ which provides the input signal as an output to lines 503 and 504, still within channel 8. The output signal from hybride $H_2$ on line 503 is also the input to line receiver 505 which receives channel 8 and produces as an output on line 506 the baseband signal (0–6 MHZ video and 7.5 MHZ audio subcarrier). The baseband signal is passed through hybrid $H_3$ which provides the baseband input on line 506 as an output on lines 507 and 508. The output on line 508 will not be considered for the moment because, as will be seen, it is only used when line equipment $E_j$ is in the called mode of operation. The output on line 507 is the input to input $a$ of calling control circuit 509.

Calling control circuit 509 is a multi-function element shown in greater detail in FIG. 10. In addition to controlling the operation of switch $SW_a$, it also ensures that digit tones are provided to the path routing arrangement on the proper carrier frequencies (1 MHZ or 2 MHZ as the case may be). Additional functions that are performed will be described as the description proceeds.

Referring now to FIG. 10, when a baseband signal appears on line 507, it is first filtered by high pass filter 195 which removes the video component (0–6 MHZ) of the baseband signal, allowing only the audio subcarrier (7.5 MHZ) to pass to line 196. Receiver 197 is a 7.5 MHZ receiver which receives the audio subcarrier on line 196 and produces at its output on line 198 audio intelligence (voice frequency) plus audio control (out-of-band —4KHZ and above). High pass filter 199 removes the voice frequency range of the audio signal and passes only the out-of-band range to its output on line 200.

The remainder of calling control circuit 509 processes the various audio control signals that may appear on line 200. The element which determines whether or not line equipment $E_j$ is in the calling mode of operation is flip-flop $FF_S$. Normally, its output on line 522 is logical 0. Consequently switch $\overline{SW}_a$ is FIG. 9 will be open meaning that line equipment $E_j$ is either in the standby mode of operation or the called mode of operation. The output of flip-flop $FF_S$ on line 522 will be switched to logical 1 if a 6200 HZ SEIZURE tone appears on line 200 provided line equipment $E_j$ is not in the called mode of operation.

When a SEIZURE tone appears on line 200 it also appears on line 200a to the input of receiver detector $R/D_S$ which is tuned to receive and detect 6200 HZ. A 6,200 HZ tone input causes the output of receiver detector $R/D_S$ on line 205 to switch to logical 1 which output is also one input of dual input logical AND gate $AND_S$. If the other input to gate $AND_S$ from line 526 is also logical 1, the output of gate $AND_S$ on line 206 to logical inverter $INV_S$ will follow the output of receiver detector $R/D_S$ on line 205. Then, the output of inverter $INV_S$ on line 207 to the set input of flip-flop $FF_S$ will switch to logical 0 when the output of receiver detector $R/D_S$, in response to a SEIZURE tone, switches to logical 1. At the termination of the SEIZURE tone, the output of inverter $INV_S$ switches from logical 0 to logical 1 thus providing a set command to flip-flop $FF_S$ causing output $P_S$ to line 522 to switch to logical 1 from logical 0. Switch $\overline{SW}_a$ in FIG. 9 will then close and line equipment $E_j$ is in the calling mode of operation.

As can be seen by referring to FIG. 9, line 526 which is one input of gate $AND_S$ in FIG. 10, receives signals from output 'c' of called control circuit 538. When line equipment $E_j$ is in the called mode of operation, the signal at output c' of called control circuit 538 is logical 0 (the means will be discussed in more detail hereinafter with reference to FIG. 11) which disables gate $AND_S$ to prevent a seizure tone from providing a set command to flip-flop $FF_S$. Nevertheless, a SEIZURE tone will be detected by receiver detector $R/D_S$ even if line equipment $E_j$ is in the called mode of operation. As can be seen in FIG. 10, the output of receiver detector $R/D_S$ on line 205 also appears as an output to line 525. Line 525, as can be seen from FIG. 9, provides an input to input b of called control circuit 538. The response of called control circuit 538 to logical signals appearing on line 525 is of concern in the called mode of operation only and will be considered later.

Referring again to FIG. 10, it can be seen that calling control circuit 509 includes four digit tone stages $DTS_1$, $DTS_2$, $DTS_3$ and $DTS_4$, only the first digit tone stage $DTS_1$ being shown in detail. The structure of each stage is identical the first, each having three inputs $a_1$, $a_2$ and $a_3$, and four outputs $a_4$, $a_5$, $a_6$ and $a_7$. As can be seen, the output $a_4$ is only used for the first stage $DTS_1$ and the outputs $a_6$, $a_7$ are not used for the fourth stage $DTS_4$. Each stage includes a receiver detector $R/D_T$ which is widely tuned to switch to logical 1 if the signal appearing at its input (on line 225 for stage $DTS_1$) is any of the 10 digit tones from 4,000 HZ to 5,800 HZ Referring to stage $DTS_1$ by way of example, when the output of receiver detector $R/D_T$ on line 226 to the input of logical inverter $INV_T$ switches to logical 1, then the output of inverter $INV_T$ on line 227 to set input $S_T$ of flip-flop $FF_T$ switches to logical 0. The output of $INV_T$ switches back to logical 1 at the termination of a tone detected by receiver detector $R/D_T$ thus providing a set command to flip-flop $FF_S$.

In the standby mode of operation, the output $P_T$ of each flip-flop $FF_T$ is of all stages logical 0. These outputs sequentially switch from logical 0 to logical 1 at the termination of each successive digit tone. Such sequential control is determined by the sequential switching of normally open switch $SW_T$ of each digit tone stage 1 which switch closes in response to a logical 1 control input (on line 222 for stage $DTS_1$) from dual input logical AND gate $AND_T$ of each stage. Referring to stage $DTS_1$ it can be seen that one input of gate $AND_T$ appears on line 220 from input $a_3$ of stage $DTS_1$; the other input appears on line 221 from complementary output $\overline{P}_T$ of flip-flop $FF_T$ via line 229 from output $\overline{P}_T$. Complementary output $\overline{P}_T$ is the inverse of output $P_T$: if $P_T = 0$, then $\overline{P}_T = 1$; if $P_T = 1$, then $\overline{P}_T = 0$. Thus, gate $AND_T$ is closed when the input to input $a_3$ is logical 1 and the output $\overline{P}_T$ of flip-flop $FF_T$ is logical 1.

Since the output $P_T$ of each flip-flop $FF_T$ is logical 0 in the standby mode of operation, the output $\overline{P}_T$ of each flip-flop $FF_T$ will be logical 1. With the exception of stage $DTS_1$, the input $a_3$ of each stage will be at logical 0 in the standby mode of operation because this input is the output $a_6$ of the previous stage (via lines 235, 239 as the case may be) which output is taken from output $P_T$ of flip-flop $FF_T$ in each stage (ie. via line 228 in stage $DTS_1$). The input $a_3$ of stage $DTS_1$ is connected to the output $P_S$ of flip-flop $FF_S$ by line 222 and the line to line 522 and is thus logical 0 when line equipment $E_j$ is in the standby mode of operation.

As has been described, when line equipment $E_j$ switches to the calling mode of operation at the end of a SEIZURE tone, the output $P_S$ of flip-flop $FF_S$ is logical 1. Then, the input $a_3$ of stage $DTS_1$ becomes logical 1. Since output $\overline{P}_T$ of flip-flop $FF_T$ in stage $DTS_1$ is also logical 1, gate $AND_T$ produces a logical 1 output on line 222 causing switch $SW_T$ in stage 1 to close. The first digit tone that appears on line 200 and, through low pass filter 201, on line 203, (which tone would be 5600 HZ — the digit 8 — on a call from PARTY A to PARTY B) also appears as an input on line 200c to input $a_1$ of stage $DTS_1$ and is passed over line 224 and through switch $SW_T$ which switch is now closed to line 225. So long as the tone appears on line 225 it also appears via line 231 at output $a_5$ of stage $DTS_1$.

When the first digit tone terminates, the output $P_T$ of flip-flop $FF_T$ in stage $DTS_1$ switches to logical 1 and output $\overline{P}_T$ of flip-flop $FF_T$ in stage $DTS_1$ switches to logical 0. The logical 0 condition of output $\overline{P}_T$ causes switch $SW_T$ in stage $DTS_1$ to open. The logical 1 condition of output $P_T$ off flip-flop $FF_T$ in stage $DTS_1$ which condition appears at input $a_3$ of stage $DTS_2$ causes switch $SW_T$ in stage $DTS_2$ to close because the output $\overline{P}_T$ of flip-flop $FF_T$ in stage $DTS_2$ is also logical 1. Stage $DTS_2$ responds to the second digit tone that appears on line 203 (which tone would be 5,400 HZ — the digit 7 — on a call from PARTY A to PARTY B) in the same manner that stage $DTS_1$ responded to the first tone. During the continuance of the second tone at input $a_1$ of stage $DTS_2$, the same tone would appear at output $a_5$ of stage $DTS_2$. In the same manner, the next two digit tones (5200 HZ-4800 HZ the digits 6-4) would appear sequentially at outputs $a_5$ of stages $DTS_3$ and $DTS_4$ respectively.

When a tone appears at an output $a_5$ of one of the digit tones stages of FIG. 10 it is directed through either amplifier $AMP_a$ to line 511 or amplifier $AMP_b$ to line 512 which lines are, respectively, inputs to the 1 MHZ and 2 MHZ modulators shown in FIG. 9. As can be seen in FIG. 10, each amplifier has three inputs, one input of which derives in each case from the output of disconnect filter 202. The other two inputs to amplifier $AMP_a$ are from output $a_5$ of stage $DTS_1$ on line 233 and output $a_5$ of stage $DTS_2$ on line 240. The other two inputs to amplifier $AMP_b$ are from output $a_5$ of stage $DTS_3$ on line 241 and output $a_5$ of stage $DTS_4$ on line 242.

Both amplifiers $AMP_a$ and $AMP_b$ operate as summing amplifiers producing at their outputs the tone that appears at one of their three inputs. The input impedance of each input to the amplifiers should be sufficiently high to avoid having a signal on one input line appear on another input line of the same amplifier with sufficient power to be detected by the receiver detector associated with the other input line. Otherwise, for example, the output $P_T$ of flip-flop $FF_T$ of stage $DTS_2$ could be switched to logical 1 at the termination of the first tone. Then, switches $SW_T$ in stage $DTS_2$ and $DTS_3$ would be closed when the second digit tone appeared and the sequential operation would be destroyed. Alternatively, any tendency for this result to occur will be suppressed by the insertion of buffer amplifiers on each of lines 215, 233, 240, 241 and 242.

Assuming then that such irregular operation does not occur, the first two digit tones that appear in sequence on line 203 will also appear in sequence at the output of amplifier $AMP_a$ to line 511, or, as shown in FIG. 9, at output $a'$ of calling control circuit 509. Likewise, the next two digit tones that appear in sequence on line 203 will also appear in sequence at the output of amplifier $AMP_b$ to line 512, or, as shown in FIG. 9, at output $b'$ of calling control circuit 509.

Referring now to FIG. 9, the tones appearing on line 511 are the modulating input to modulator $MOD_1$, the output of which modulator is a 1 MHZ carrier on line 513 to hybrid $H_7$ — the carrier being modulated by the modulating input. Hybrid $H_7$ produces at its output on line 515 the signals that appear on lines 513 and 514. The signal that appears on line 514 is a 2 MHZ carrier from modulator $MOD_2$ which carrier is modulated by tones appearing at the input to modulator $MOD_2$ on line 512.

The 1 MHZ and 2 MHZ modulated carrier signals are combined by hybrid $H_8$ with the channel 8 LOW signal appearing on line 504. Thus, the combined channel 8 LOW signal and modulated 1 MHZ and 2 MHZ carrier signals appear at the output of hybrid $H_8$. Switch $SW_a$ which is now closed passes the combined signals to the input of line amplifier $AMP_1$. From the output of amplifier $AMP_1$ the combined signals appear on line 518 to the input of hybrid $H_9$ which hybrid provides the output of line equipment $E_j$ to line $I_j$.

The sequence of tones appearing on the 1 MHZ and 2 MHZ carriers will first cause vertical transmission gate $GV_{48,28,87}$ (see FIG. 8) to open and then cause horizontal transmission gate $GH_{48,87,64}$ (see FIG. 8) to open — assuming that the gates are generally as shown in FIG. 7 and assuming that the gates are not disabled by busy signals. If the gates were disabled, then of course a path to PARTY B would not be established. FIG. 9 does not show means that would detect that a path has not been established — ie., there is no provision for a busy signal.

FIG. 9 does show a means to provide a dial tone indicating that line equipment $E_j$ has switched to the calling mode of operation. When the output $e'$ of calling control circuit 509 is logical 1, normally open switch $SW_c$ is caused to close allowing a dial tone appearing on a 7.5 MHZ audio subcarrier line 528 at the output of dial tone generator 527 to pass through switch $SW_c$ to the input of hybrid $H_5$ on line 529. The dial tone per se may be any audible frequency or frequencies attractive to the human ear. The 7.5 MHZ modulated subcarrier signal appears at the output of hybrid $H_5$ on line 533 to the input of hybrid $H_4$, and then at the output of hybrid $H_4$ on line 545 to the input of line transmitter 546. Inputs to line transmitter 546 are transmitted at its output on line 547 on the 270 MHZ channel 8 HIGH carrier frequency required for reception by the subscriber terminal of PARTY A. The line transmitter output on line 547 is amplified by line $AMP_3$ and appears as the input to hybrid $H_1$ on line 548 which hybrid provides the output on line $L_j$ to subscriber terminal $T_j$ (not shown in FIG. 9.)

Referring to FIG. 10, it can be seen that a logical 1 condition on line 524 to switch $SW_c$ in FIG. 9 will only appear so long as the output of dual input logical AND gate 210 is logical 1. The output of gate 210 is logical 1 only if the input thereto one line 210 from the output $P_S$ of flip-flop $FF_S$ (via the line "to line 522") is logical 1 and if the input thereto on line 232 from output $a_4$ of stage $DTS_1$ is logical 1. It may readily be concluded that a dial tone will last from the time line equipment $E_j$ switches to the calling mode of operation and until the termination of the first digit tone.

Assuming that a bi-directional communications link is established between PARTY A and PARTY B, communications signals from PARTY B appearing at the input of hybrid $H_9$ from line $I_j$ will appear at the output of hybrid $H_9$ on line 530 to front wall receiver 531. Since in general such communicaations signals may occupy any one of ten HIGH channels, and since line equipment $E_j$ shown in FIG. 9 does not include means to automatically tune front wall receiver 531 for the channel it will receive, then, the receiver 531 must be widely tuned to receive any of the 10 HIGH channels.

The output of front wall receiver 531 on line 532 to hybrid $H_5$ is the baseband (0–6 MHZ video and 7.5 MHZ audio subcarrier) of the channel being received. From the output of hybrid $H_5$ on line 533, the baseband signal follows the same path and undergoes the same conditioning as was described for the 7.5 MHZ dial tone subcarrier. The baseband signal is transmitted to subscriber terminal $T_j$ (not shown in FIG. 9) on channel 8 HIGH.

It is thus apparent that, in the calling mode of operation and except when the input from line $I_j$ is channel 8 HIGH, communication signals passing through line equipment $E_j$ from line $I_j$ to line $L_j$ undergo carrier frequency translation as a result of the combined effect of front wall receiver 531 and line transmitter 546.

Line equipment $E_j$ shown in FIG. 9 switches from the calling mode of operation back to the standby mode of operation in response to a 6200 DISCONNECT tone appearing on the proper subcarrier and carrier frequencies as an input on line $L_j$. When such tone appears it detected by calling control circuit 509 in much the same manner as other audio control signals. Referring to FIG. 10, a tone appearing at the input of disconnect filter 202 on line 200b will appear at the output of filter 202 if it is a 6000 HZ DISCONNECT tone. This filter is a band pass filter sharply tuned to back control tones other than 6000 HZ. Receiver detector R/D$_d$ receives the output of filter 202 on line 212 and switches to logical 1 at its output on line 213 if a DISCONNECT tone appears at its input. (Because of the filtering action of filter 202 it is not necessary that receiver detector R/D$_d$ be sharply tuned for 6000 HZ). Through logical inverter INV$_d$ and line 214 to reset input R$_S$ of flip-flop FF$_S$, flip-flop FF$_S$ is reset to its standby mode condition at the termination of a disconnect tone. Likewise, flip-flops FF$_T$ in stages DTS$_1$ to DTS$_4$ receive, via lines 216, 234, 236 and 238, reset commands at their inputs R$_T$ at the same time.

As can be seen, any DISCONNECT tone that appears at the output of disconnect filter 202 on line 212 becomes an input (via lines 215 and 219) to both amplifiers AMP$_a$ and AMP$_b$ — in the result modulating both the 1 MHZ and 2 MHZ carrier signals being transmitted to the line equipment on line I$_j$. At the termination of the DISCONNECT tone on the 1 MHZ and 2 MHZ carriers, the open transmission gates in the path routing arrangement on the path between PARTY A and PARTY B are caused to close, The purpose of low pass filter 201 can now be seen. In passing only audio control signals below 6000 Hz, filter 201 does not allow a DISCONNECT tone to operate the receiver detectors R/D$_T$ associated with flip-flops FF$_T$ in the stages DTS$_1$ to DTS$_4$. Otherwise, unless such receiver detectors were designed not to respond to the 6,000 HZ DISCONNECT tone, a flip-flop FF$_T$ might receive a set command and a reset command at the same time. This situation would arise where a DISCONNECT tone was received before a digit tone sequence was complete. One of the switches SW$_T$ would be closed meaning that its corresponding receiver detector R/D$_T$ would detect the DISCONNECT tone at the same time as receiver detector R/D$_d$. An alternative way to control this situation would be to insert a time delay in line 216 — for example, two logical inverters connected in series.

2. Standby-Called-Standby

Ordinarily, line equipment E$_j$ switches from the standby mode of operation to the called mode of operation on detection of a 2 MHZ carrier signal input from line $\phi_j$ to H$_{10}$. The one exception is where the condition on line 523 from line 522 to input c of called control circuit 538 is logical 1 meaning that PARTY A must have called his own number.

Figure 11:
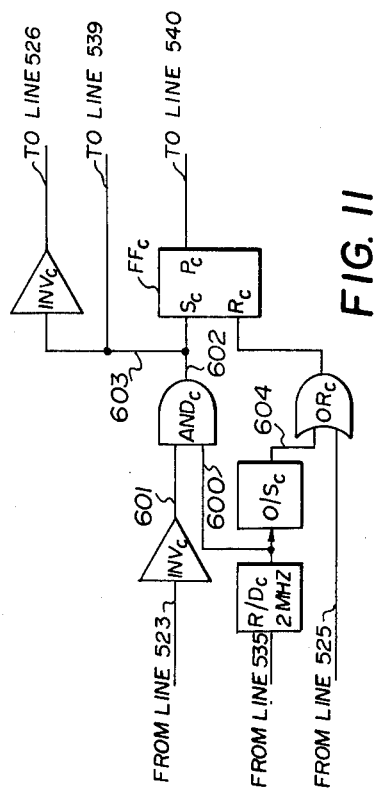
FIG. 11 is a detailed circuit diagram of the called control circuit of FIG. 9.

The 2 MHZ carrier is detected by called control circuit 538 receiving its input at input a from hybrid H$_{10}$ via lines 534 and 535. As can be seen in FIG. 11, the input to called control circuit 538 from line 535 is received by receiver detector R/D$_c$ which receiver is tuned to 2 MHZ and produces a logical 1 output on line 600 whenever a 2 MHZ signal is detected. Line 600 is one input of dual input AND gate AND$_c$, the output of which gate on line 602 switches to logical 1 if the input on line 601 from logical inverter INV$_c$ is logical 1 when a 2 MHZ signal is detected. The output of inverter INV$_c$ will be logical provided its input on line 523 is logical 0 (ie. if A has not called his own number). When the condition on line 602 switches to logical 1, three events occur. Firstly, flip-flop FF$_c$ is set by the logical 0 to logical 1 transition occurring at its input S$_c$. Accordingly, the output to line 540 from output P$_c$ of flip-flop FF$_c$ switch to logical 1. The logical 1 condition on line 540 closes normally open switch SW$_d$ which allows signals appearing at the output of ring tone generator 541 on line 542 to pass through switch SW$_d$ to the input of hybrid H$_6$ on line 543. As in the case of dial tone generator 527, ring tone generator produces audibly attractive ring tones on a 7.5 MHZ audio subcarrier for ultimate reception by subscriber terminal T$_j$. The input to hybrid H$_6$ on line 543 appears at the output of hybrid H$_6$ on line 544 to the input of hybrid H$_4$ from the output of which, on line 545, the signal follows the same path and undergoes the same conditioning as inputs to hybrid H$_4$ from line 533. The ring tone terminates when flip-flop FF$_c$ in FIG. 11 receives a reset command at input R$_c$ from line 605 through logical OR gate OR$_c$ from line 525. As can be seen from FIG. 10 a reset command will be provided to line 525 when receiver detector R/D$_s$ detects a SEIZURE tone (ie. when the receiver at subscriber terminal T$_j$ is picked up).

At the same time that output P$_c$ of flip-flop FF$_c$ in FIG. 11 switches to logical 1, the output of logical inverter INV$_c$, receiving its input on line 603 from line 602, switches to logical 0. The logical 0 condition appears on line 526. As can be seen in FIG. 10, a logical 0 condition on line 526 disables gate AND$_S$ so that a SEIZURE tone cannot now cause a set command to appear at input SS of flip-flop FF$_S$.

Finally, when the condition on line 602 is logical 1, the output to line 539 from line 603 is also logical 1. The logical 1 condition on line 539 (from output a' of called control circuit 538 to switch SW$_b$ in FIG. 9) causes normally open switch SW$_b$ to close thereby completing a transmission path from the output of hybrid H$_3$ on line 508 to line $\phi_1$. As will be recalled, the signal on line 508 will be baseband components of channel 8 LOW. These components are received from line 508 by back wall transmitter 510 and transmitted to line 519 on the 270 MHZ carrier for channel 8 HIGH. The signal on line 519 passes through switch SW$_b$, now closed, to the input of line amplifier AMP$_2$ from line 520. The output of line amplifier 521 appears at the input of hybrid H$_{10}$ on line 521, which hybrid provides the output on line $\phi_j$ to the calling party.

Signals received from line $\phi_j$ appear on line 534 at the input of back wall receiver 536 as well as the input of called control circuit 538. Since back wall receiver 536 may be required to receive any of 10 LOW channels and since the line equipment does not include channel selection means to automatically tune the receiver to receive particular channels, it must be broadly tuned to receive any of the ten LOW channels.

The output of backwall receiver 536 on line 537 to hybrid H$_6$ is the baseband component of the channel at the output of hybrid H$_{10}$ on line 534 from the output of hybrid H$_6$ on line 544, the baseband signals will follow the same path and undergo the same conditioning as signals from ring tone generator 541.

In the called mode of operation, it is thus apparent that communications signals passing through line equipment E$_j$, either from line L$_j$ to line $\phi_j$, or from line $\phi_j$ to line L$_j$, will undergo carrier frequency translation. Channel 8 LOW received on line L$_j$ is converted to channel 8 HIGH by the combined effect of line receiver 505 and back wall transmitter 510. Any channel (which channel will be a LOW channel) received on line $\phi_j$ will be converted to channel 8 HIGH by the combined effect of back wall receiver 536 and line transmitter 546.

As can be concluded from FIG. 11, the called mode of operation for line equipment $E_j$ in FIG. 9 will endure only so long as a 2 MHZ signal is detected by receiver detector R/D$_c$. The 2 MHZ signal is of course the 2 MHZ carrier from modulator MOD$_2$ of the calling party's line equipment and will terminate when the calling party causes a DISCONNECT tone to be produced. The transmission gates in the path routing arrangement are then caused to open breaking the path for the 2 MHZ carrier from the calling party to the called party. The output from the circuit of FIG. 11 to line 526 returns to logical 1; the output to line 539 returns to logical 0; and since flip-flop FF$_c$ was previously reset when PARTY picked up his receiver, the line equipment $E_j$ has now returned to the standby mode of operation.

It may occur on a call to PARTY A that PARTY A will not pick up his receiver to generate the SEIZURE tone necessary to reset flip-flop FF$_c$ in FIG. 11. Accordingly, one-shot multivibrator O/S$_c$ is included in called control circuit 538 to produce a reset pulse whenever receiver detector R/D$_c$ switch from logical 1 to logical 0. Thus, when a negative switching transition from logical 0 to logical 1 appears on line 600 one shot multivibrator O/S$_c$ produces a logical 1 pulse at its output on line 604 to gate OR$_c$. The same pulse appears at the output on line 604 to gate OR$_c$. The same pulse appears at the output of gate OR$_c$ on line 605 to reset input R$_c$ of flip-flop FF$_c$. The logical 0 to logical 1 switching transition on the leading edge of the pulse causes flip-flop FF$_c$ to be reset. Hence, if Party A does not pick up his receiver, calling control circuit 538 will nevertheless be returned to its initial condition at the termination of a 2 MHZ input detected by R/D$_c$. Line equipment $E_j$ will then be in the standby mode of operation.

3. General

There are some additional observations that might be made regarding line equipment $E_j$ in FIG. 9.

Firstly, it will now be apparent that certain elements of FIG. 9 are only operative depending on the mode of operation. For example, back wall transmitter 510 and back wall receiver 536 are only operative in the called mode of operation. Front wall receiver 531 is only operative in the calling mode of operation. Line transmitter 546 is operative in the called mode of operation or the calling mode of operation. Line receiver 505, however, is operative in all three modes of operation — standby, calling, and called. Although not shown in FIG. 9, it would of course be a simple matter to include means to switch such transmitters or receivers on or off, as required, depending on the mode of operation. A logical 1 signal is available as a control signal on line 522 in the calling mode of operation and a logical 1 signal is available on line 539 in the called mode of operation.

Secondly, as has been said, in the absence of means to automatically tune front wall receiver 531 and back wall receiver 536, such receivers must be widely tuned to receive any of 10 HIGH channels (in the case of receiver 531) or any of 10 LOW channels (in the case of receiver 536). Such wide tuning may cause undesirable noise in the system. Also, from earlier discussions, it will be recalled that it is contemplated that some embodiments of line equipment (then referred to as "external equipment") will be conditioned to receive particular channels to avoid interference when a front horizontal transmission track forms a part of the bi-directional link between more than one pair of incoming and outgoing lines. (The latter situation does not arise where the line equipment is as shown in FIG. 9 and the transmission gates are as shown in FIG. 7 with the BUSY LINES of such gates connected in the manner aforesaid, but, whatever the reason for conditioning receivers to receive particular channels, the means in general may be the same).

With regard to FIG. 9, it is evident that line equipment $E_j$ will in all cases "know" in advance what channel will be received on line $I_j$ from a called party. For example, when PARTY A calls PARTY B (No. 8764), it is known that the channel that will be received from incoming line $I_j$ will be channel 4 HIGH. The "knowledge" as such may derive from output $a_5$ of digit tone stage DTS$_4$ of calling control circuit 509. Such output is the digit tone corresponding to the last digit of the number of a called party. Where PARTY A calls PARTY B the tone at output $a_5$ would be 4,800 HZ, representing the digit 4.

Figure 12:
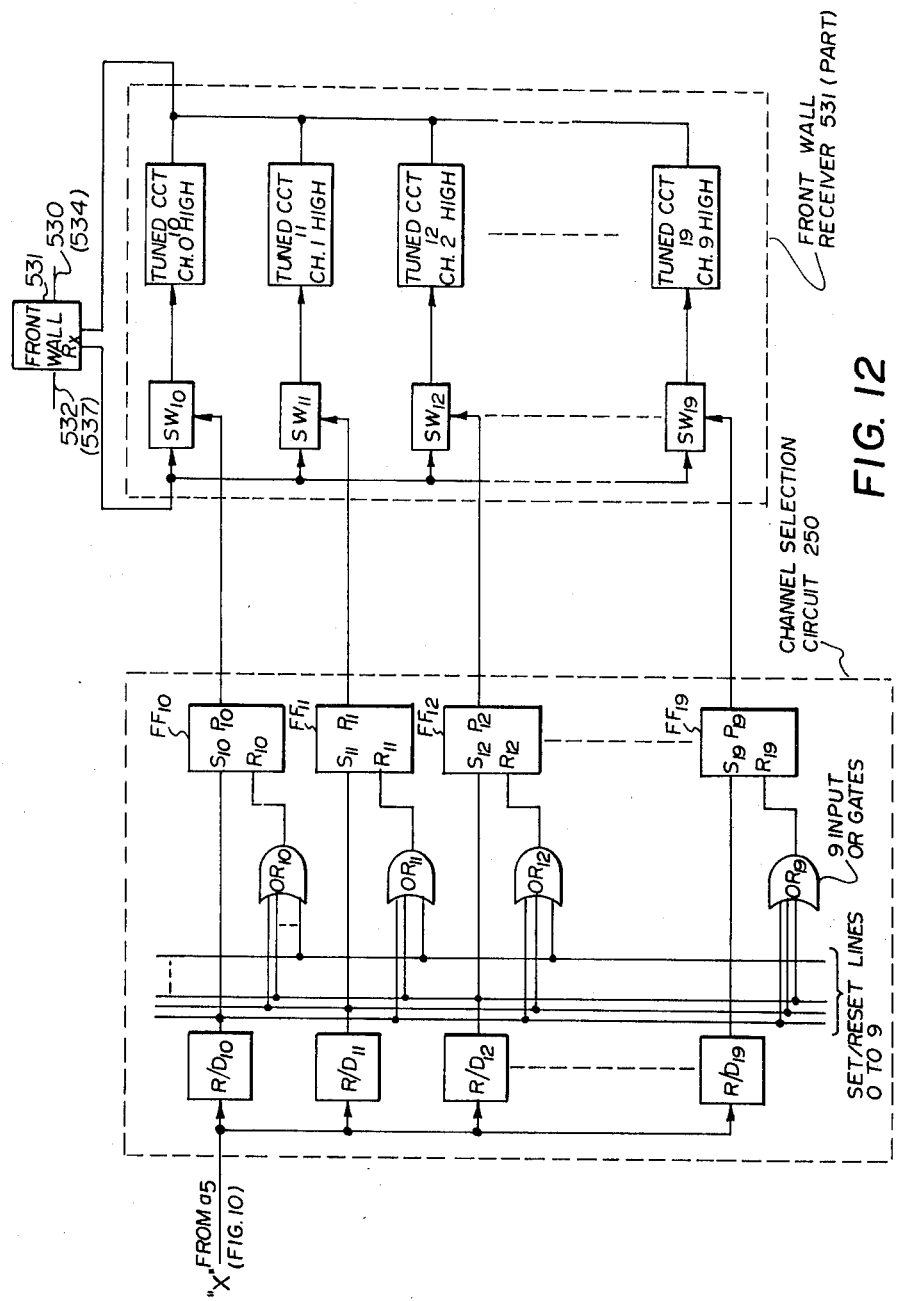
FIG. 12 is a circuit diagram of a circuit to automatically time the frequency of a receiver to receive a desired channel.

FIG. 12 illustrates how the tone appearing at output $a_5$ of stage DTS$_4$ may be used to condition line equipment $E_j$ to receive a particular channel from incoming line $I_j$. Since the elements are very similar to elements previously described FIG. 12 will only be considered briefly. As can be seen, a digit tone appear at output $a_5$ will be the input to a bank of ten receiver detectors R/D$_{10}$ to R/D$_{19}$ in channel selection circuit 250, only four of which receiver detectors are shown in FIG. 12. Receiver detectors R/D$_{10}$ to R/D$_{19}$ are tuned to receive and detect the tones 4,000 HZ to 5,800 HZ (digits 0 to 9), respectively. When a digit tone is detected, the output of the receiver detector that detected the tone switches to logical 1. As can be seen, the output of each receiver detector is the set input of a corresponding flip-flop FF$_{10}$ to FF$_{19}$, as the case may be. Likewise, the output of each receiver detector, through set/reset lines 0 to 9 is the input of nine logical OR gates associated with the other nine receiver detectors. For example, the output of receiver detector R/D$_{12}$ is the input of gates OR$_{10}$, OR$_{11}$, OR$_{13}$ or OR$_{18}$ (not shown), and OR$_{19}$. Thus, when the output of a receiver detector R/D$_{10}$ to R/D$_{19}$ switches to logical 1, the flip-flop FF$_{10}$ to FF$_{19}$, as the case may be, associated with the receiver detector receives a set command causing its output P$_{10}$ to P$_{19}$, as the case may be, to switch to logical 1 (or do nothing if such output is already logical 1). The logical 1 output of the receiver detector that switched also appears, through the OR gates associated with the nine other receiver detectors, at the reset inputs of the other flip-flops associated with the nine other receiver detectors. Accordingly, all such other flip-flops receive a reset command. The output of any such flip-flop that is not already logical 0 is caused to switch to logical 0.

The outputs P$_{10}$ to P$_{19}$ of flip-flops FF$_{10}$ to FF$_{19}$ control switches SW$_{10}$ to SW$_{19}$, respectively, in front wall receiver 531, which, as now considered, is an all-wave receiver, the tuning range of which is changed by switching tuned circuits of the receiver. Switches SW$_{10}$ to SW$_{19}$ are normally open but close in response to a logical 1 command from the output P$_{10}$ to P$_{19}$, as the case may be. Ordinarily, only one such switch is closed depending on which output P$_{10}$ to P$_{19}$ is logical 1.

The design of all-wave receivers is well known as is the automatic switching of tuned circuits thereof to tune the receivers to receive a desired channel. Accordingly, the detailed circuit design of such receivers will not be considered.

Referring again to FIG. 9, it is apparent that line equipment $E_j$ cannot "know" the channel number of an input from line $\phi_j$ unless it is told by the calling party. Thus back wall receiver 536 cannot be tuned in response to control signals initiated from line equipment $E_j$. Any automatic tuning means for receiver 536 must ultimately be controlled by the calling party.

Figure 13A:
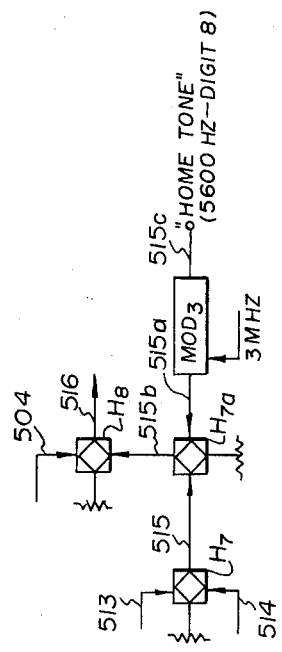
FIG. 13a illustrates a modification to the circuit of FIG. 9 to enable a calling party to identify himself to a called party.
Figure 13B:
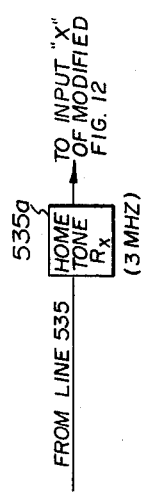
FIG. 13b illustrates a modification to the circuit of FIG. 9 to enable a called party to receive a tone that identifies a calling party.

FIGS. 13a and 13b illustrate how line equipment may be modified to allow a calling party to tune the back wall receiver 536 of a called party. As can be seen, FIG. 13a repeats some of the elements of FIG. 9 and includes in addition a 3 MHZ modulator $MOD_3$ and a further hybrid $H_{7a}$ which receives inputs from the output of hybrid $H_7$ on line 515 and from the output of modulator $MOD_3$ on line 515a. The output of hybrid $H_{7a}$ is on line 515a to hybrid $H_8$. Modulator $MOD_1$ receives as a modulating input on line 515c a HOME TONE which identified line equipment $E_j$ and consequently the subscriber terminal $T_j$ associated therewith. The HOME TONE, which may be produced by a simple oscillator (not shown) included in line equipment $E_j$, has a frequency corresponding to the last digit of the number identifying subscriber terminal $T_j$ (No. 4828) — in the present case 5,600 HZ representing the digit 8. Thus, when PARTY A is the calling party, the output to line $I_j$ includes a 3 MHZ carrier modulated by a 5,6000 HZ HOME TONE.

For purposes of responding to a HOME TONE received on line $\phi_j$, line equipment $E_j$ now includes a home tone receiver 535a as shown in FIG. 13b plus a modified version of FIG. 12. Home tone receiver 535a is tuned to receive 3 MHZ modulated carrier inputs from line 535 and produce at its output "to input X" the modulaing frequency or home tone. Input X is the input X shown in FIG. 12 wherein (a) front wall receiver 531 is now to be considered as back wall receiver 536; (b) the designation "FROM $a_5$" (FIG. 10) is to be ignored; (c) the designation "530" is now to be taken as "534"; and (d) the designaion "532" is now to be taken as "537". Also, tuned circuits 10 to 19 in FIG. 12 are now tuned for LOW channels rather than HIGH channels as shown.

From the description of the tuning of front wall receiver 531, it will readily be concluded that back wall receiver 536 will be tuned for a particular low channel depending on the frequency of the HOME TONE from a calling party.

In some embodiments of line equipment, it may be desirable to tune line transmitters to transmit on a particular channel. For example, according to the fourth method of channel assignment shown in FIG. 8a, it is apparent that the line equipment $E_k$ of PARTY B (the called party) must convert channel 4 LOW inputs received on line $L_k$ to channel 8 HIGH outputs to line $\phi_k$. Since channel 8 HIGH is a channel determined by PARTY A, then line equipment $E_k$ must be conditioned to transmit on such channel by control from PARTY A. Although line equipment $E_j$ shown in FIG. 9 was not designed for the fourth method of channel assignment shown in FIG. 8a, it may readily be concluded that with some modification and the use of HOME TONES to tune back wall transmitter 510 as well as back wall receiver 536, then, the desired channel assignment will be achieved. Front wall receiver 531 may now be permanently tuned to receive only channel 8 HIGH since this will always be the channel input on line $I_j$. However, in the called mode of operation the channel received by back wall receiver 536 (a LOW channel) and the channel transmitted by back wall transmitter 510 (a HIGH channel) will vary depending on the last digit of the number identifying the calling party. Back wall receiver 536 may be tuned by a HOME TONE in the manner aforesaid. Similarly, the same HOME TONE may be used to discretely control the transmitting carrier frequency of back wall transmitter 510 by switching tuned circuits of the transmitter carrier frequency oscillator. Similar to the case of receivers, the design of transmitters to automatically transmit on one of a number of transmitting frequencies is well known and detailed circuit design will not be considered.

Figure 14:
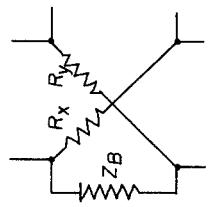

The hybrids shown in FIGS. 9 and 13a may be conventional resistive hybrids as shown in FIG. 14 comprising resistors $R_x$, $R_y$ and balancing impedance $Z_b$. The loss through each will be 6 dB, but such loss may be recovered by the line amplifiers $AMP_1$, $AMP_2$ and $AMP_3$ which also compensate for losses in the transmission paths outside the line equipment $E_j$.

Line equipment $E_j$ as shown in FIG. 9 is not suitable to control transmission gates such as are shown in FIGS. 5a and 5b which require that coded control signals be received within predetermined time intervals. For the circuit of FIG. 9, the control signals which originate at first instance from the subscriber terminal $T_j$ (not shown in FIG. 9) in effect flow through line equipment $E_j$ via calling control circuit 509 from line $L_j$ to line $I_j$ at a rate determined by the rate of manual activity at the subscriber terminal. To produce the control signals required to operate transmission gates such as are shown in FIG. 5a or 5b, it is contemplated that the calling control circuit would include a storage means to record the number of the called party, and then produce the necessary control signals to close or open the transmission gates during a rapid playback of digits of the recorded number — the order of the digits in the playback depending on whether the transmission gates were to be closed or opened. For the transmission gate of FIG. 5b used as a vertical transmission gate, the two digit tones representing the identification of the incoming line would be added to the playback sequence following the two digits tones identifying the connecting front horizontal transmission track. A playback sequence would be initiated on a call from one party to another when the alst digit tone identifying the called party is detected by the calling party's called control circuit. Likewise, a playback sequence would be initiated when a DISCONNECT tone is detected by the calling party's called control circuit.

Obviously, many modifications and variations in the present invention are possible in light of the foregoing teachings. It is, therefore, to be understood that within the scope of the appended claims, the invention may be practiced otherwise than as specifically described.

I claim:

1. A path routing arrangement for use in a frequency division branched path carrier communications system, said path routing arrangement comprising:
   a. an integer number N of first transmission tracks and an equal number of second transmission tracks;
   b. branched path means interconnecting said first transmission tracks and said second transmission tracks in a branched path manner for selectively providing a desired carrier transmission path between a preselected one of said first transmission tracks and a preselected one of said second transmission tracks whereby a desired transmission path through said path routing arrangement is defined for a first communications carrier having a predetermined first carrier frequency and propagating in a first direction along the defined path and for a second communications carrier having a predetermined second carrier frequency and propagating in the opposite direction along the defined path; said second carrier frequency being different than said first carrier frequency by a predetermined amount; said branched path means including an integer number N of third transmission tracks defining branching paths between said first transmission tracks and said second transmission tracks; said desired transmission path being a transmission path defined by said preselected transmission tracks and a unique one of said third transmission tracks which is interconnected with said preselected first and second tracks; each of said transmission tracks and any carrier transmission path so defined being electrically unbalanced and shielded to substantially confine communications carriers propagating therein and allowing communication carriers gaining access thereto to propagate in and energize the transmission track or path, as the case may be.

2. A path routing arrangement as defined in claim 1 wherein said first transmission tracks are arranged in $n$ first groups of $n$ first transmission tracks per first group, and wherein said second transmission tracks are arranged in $n$ second groups of $n$ second transmission tracks per second group; and wherein $n$ is an integer number greater than 1.

3. A path routing arrangement as defined in claim 2 wherein, for each particular first group, said branched path interconnecting means comprises a third group of $n$ of said third transmission tracks, each of which third transmission tracks interconnects with each first transmission track of such particular first group and interconnects with each second transmission track of a unique one of said second groups.

4. A path routing arrangement as defined in claim 3 wherein each third transmission track is so interconnected with each first transmission track by a first means for selectively providing a communication path therebetween, and is so interconnected with each second transmission track by a second means for selectively providing a communications path therebetween.

5. A path routing arrangement as defined in claim 4 wherein said transmission tracks are co-axial lines and wherein said first means and said second means each comprise a co-axial switch.

6. A path routing arrangement as defined in claim 4 wherein each of said first means and each of said second means is a coded transmission gate normally closed to prevent carrier transmission between the transmission tracks interconnected by such transmission gate; each particular transmission gate including means for receiving a coded input signal, and, if such coded input signal represents, in a selected code, the identification of such particular gate, for causing such particular gate to open to allow carrier transmission between the transmission tracks interconnected by such particular transmission gate.

7. A path routing arrangement as defined in claim 6 wherein said receiving means of a transmission gate interconnecting a given first transmission track and a given third transmission track includes means to detect said coded signal input provided as an input to the given first transmission track.

8. A path routing arrangement as defined in claim 6 wherein said receiving means of a transmission gate interconnecting a given second transmission track and a given third transmission track includes means to detect said coded signal input provided as an input to the given third transmission track from a first transmission track interconnected to said given third transmission track.

9. A path routing arrangement as defined in claim 8 wherein said transmission tracks are co-axial lines.

10. A frequency division branched path path routing system for interconnecting a plurality of subscriber terminals to allow bi-directional carrier communications to take place between calling ones and called ones of the subscriber terminals, each subscriber terminal being adapted to transmit communications signals on a pre-assigned first carrier frequency and being adapted to receive communications signals on a second pre-assigned carrier frequency different in frequency from the first carrier frequency by a pre-assigned amount; said system including a branched path path routing arrangement for performing path routing operations between called ones and calling ones of the subscriber terminals; said arrangement comprising:

a. a plurality of each of first and second transmission tracks, each first transmission track and each second transmission track acting in association with one of the subscriber terminals;

b. branched path means interconnecting said first transmission tracks and said second transmission tracks in a branched path manner for selectively providing a desired carrier transmission path between a pre-selected one of said first transmission tracks and a pre-selected one of said second transmission tracks to define a transmission path through said path routing arrangement for communications between the calling subscriber terminal associated with said pre-selected first transmission track and the called subscriber terminal associated with said second transmission track; said branched path means including a plurality of third transmission tracks.

11. A frequency division branched path path routing system as defined in claim 10, wherein each of said transmission tracks and any transmission path so defined is electrically unbalanced and shielded to substantially confine communications carriers propagating therein, and to allow communications carriers gaining access thereto to propagate in and energize the transmission track or path, as the case may be.

12. A frequency division branched path path routing system as defined in claim 11 wherein said first transmission tracks are arranged in $n$ first groups of $n$ first transmission tracks per first group, and wherein said second transmission tracks are arranged in $n$ second groups of $n$ second transmission tracks per second group; and wherein $n$ is an integer number greater than 1.

13. A frequency division branched path path routing system as defined in claim 12 wherein, for each particular first group, said branched path interconnecting means comprises a third group of $n$ of said third transmission tracks, each of which third transmission tracks interconnects with each first transmission track of such particular first group and interconnects with each second transmission track of a unique one of said second groups.

14. A frequency division branched path path routing system as defined in claim 13 wherein each third transmission track is so interconnected with each first transmission track is so interconnected by a first means for selectively providing a communications path therebetween, and is so interconnected with each second transmission track by a second means for selectively providing a communications path therebetween.

15. A frequency division branched path path routing system as defined in claim 14 wherein said transmission tracks are co-axial lines and wherein said first means and said second means each comprise a co-axial switch.

16. A frequency division branched path path routing system as defined in claim 15 wherein each of said first means and each of said second means is a coded transmission gate normally closed to prevent carrier transmission between the transmission tracks interconnected by such transmission gate; each particular transmission gate including means for receiving a coded input signal, and, if such coded input signal represents, in a selected code, the identification of such particular gate, for causing such particular gate to open to allow carrier transmission between the transmission tracks interconnected by such particular transmission gate.

17. A frequency division branched path path routing system as defined in claim 16 wherein said receiving means of a transmission gate interconnecting a given first transmission track and a given third transmission track includes means to detect said coded signal input provided as an input to said first transmission track; and wherein said receiving means of a transmission gate interconnecting a given second transmission track and a given third transmission track includes means to detect said coded signal input provided as an input to the given third transmission track from a first transmission track interconnected to said given third transmission track.

* * * * *